United States Patent
Kimoto et al.

(10) Patent No.: US 10,430,143 B2
(45) Date of Patent: Oct. 1, 2019

(54) IMAGE OUTPUT APPARATUS, IMAGE DISPLAY APPARATUS, CONTROL METHOD OF IMAGE OUTPUT APPARATUS, AND CONTROL METHOD OF IMAGE DISPLAY APPARATUS

(71) Applicant: CANON KABUSHIKI KAISHA, Tokyo (JP)

(72) Inventors: Tatsuya Kimoto, Utsunomiya (JP); Eito Sakakima, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 15/509,338

(22) PCT Filed: Aug. 31, 2015

(86) PCT No.: PCT/JP2015/004418
§ 371 (c)(1),
(2) Date: Mar. 7, 2017

(87) PCT Pub. No.: WO2016/038846
PCT Pub. Date: Mar. 17, 2016

(65) Prior Publication Data
US 2017/0262249 A1    Sep. 14, 2017

(30) Foreign Application Priority Data

Sep. 8, 2014  (JP) .................................. 2014-182451
May 29, 2015  (JP) .................................. 2015-109662

(51) Int. Cl.
*G06F 3/14*    (2006.01)
*G06F 3/147*   (2006.01)
(Continued)

(52) U.S. Cl.
CPC .............. *G06F 3/1446* (2013.01); *G06F 3/14* (2013.01); *G06F 3/147* (2013.01); *G06F 3/1431* (2013.01);
(Continued)

(58) Field of Classification Search
CPC ........ G06F 3/1446; G06F 3/14; G06F 3/1431; G06F 3/147; G09G 2370/042;
(Continued)

(56) References Cited

U.S. PATENT DOCUMENTS

2004/0046772 A1    3/2004    Ouchi et al.
2004/0080482 A1    4/2004    Magendanz et al.
(Continued)

FOREIGN PATENT DOCUMENTS

CN    102782748 A    11/2012
JP    2012-054700 A    3/2012
(Continued)

OTHER PUBLICATIONS

PCT/IB/326 (PCT Notification Concerning Transmittal of International Preliminary Report on Patentability).
(Continued)

*Primary Examiner* — Charles V Hicks
(74) *Attorney, Agent, or Firm* — Cowan, Liebowitz & Latman, P.C

(57) ABSTRACT

An image output apparatus according to the present invention includes: communicating units; an acquiring unit configured to acquire, for each of the communicating unit connected to an image display apparatus, correspondence information; a setting unit configured to set, for each of the communicating unit, an output mode; and an outputting unit configured to output, for each of the communicating unit, image data based on an output mode set with respect to the communicating unit, wherein the setting unit automatically
(Continued)

sets a first output mode with respect to a communicating unit for which the correspondence information has been acquired.

20 Claims, 20 Drawing Sheets

(51) Int. Cl.
  *G09G 5/00* (2006.01)
  *G09G 5/14* (2006.01)
(52) U.S. Cl.
  CPC ............... *G09G 5/003* (2013.01); *G09G 5/14* (2013.01); *G09G 2340/0407* (2013.01); *G09G 2340/0464* (2013.01); *G09G 2352/00* (2013.01); *G09G 2370/042* (2013.01); *G09G 2370/045* (2013.01); *G09G 2370/047* (2013.01); *G09G 2370/20* (2013.01); *G09G 2370/22* (2013.01)
(58) Field of Classification Search
  CPC ... G09G 2340/0464; G09G 2340/0407; G09G 5/14; G09G 5/003; G09G 2370/22; G09G 2370/045; G09G 2352/00; G09G 2370/047; G09G 2370/20
  See application file for complete search history.

(56) References Cited

U.S. PATENT DOCUMENTS

| | | | | |
|---|---|---|---|---|
| 2008/0036691 | A1* | 2/2008 | Yamada | G06F 3/1446 345/1.1 |
| 2011/0164065 | A1* | 7/2011 | Mate | G06F 3/1446 345/676 |
| 2014/0240201 | A1* | 8/2014 | Takahashi | G06F 3/1446 345/1.3 |
| 2014/0362295 | A1 | 12/2014 | Suzuki | |

FOREIGN PATENT DOCUMENTS

| | | |
|---|---|---|
| JP | 2012-230231 A | 11/2012 |
| JP | 2013-098903 A | 5/2013 |
| JP | 2013-516651 A | 5/2013 |
| WO | 2013/077203 A1 | 5/2013 |
| WO | 2013/099369 A1 | 7/2013 |
| WO | 2013/099377 A1 | 7/2013 |

OTHER PUBLICATIONS

PCT/IB/373 (PCT International Preliminary Report on Patentability).
PCT/ISA/237 (PCT Written Opinion of the International Searching Authority).
The above patent documents were cited in a European Search Report dated Apr. 23, 2018, which is enclosed, that issued in the corresponding European Patent Application No. 15840279.2.
The foreign references 1, 5 and 6 were cited in the International Search Report dated Nov. 24, 2015 of International Application No. PCT/JP2015/004418, which is enclosed.
The foreign references 1-2 and 5 were cited in a May 31, 2016 Japanese Office Action, which is enclosed without an English Translation, that issued in Japanese Patent Application No. 2015-109662.
The above foreign patent document was cited in a Mar. 11, 2019 Chinese Office Action, which is enclosed with an English Translation, that issued in Chinese Patent Application No. 201580048282.5.

* cited by examiner

FIG. 7
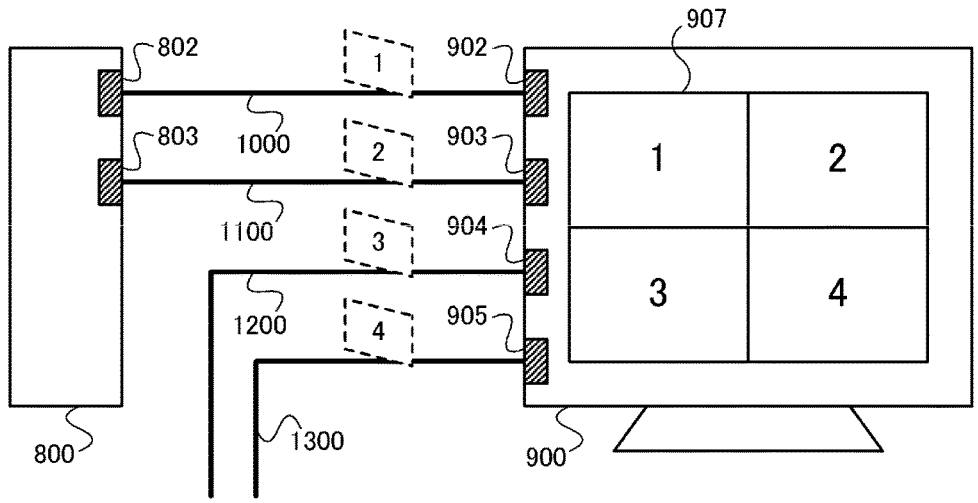
FIG. 8
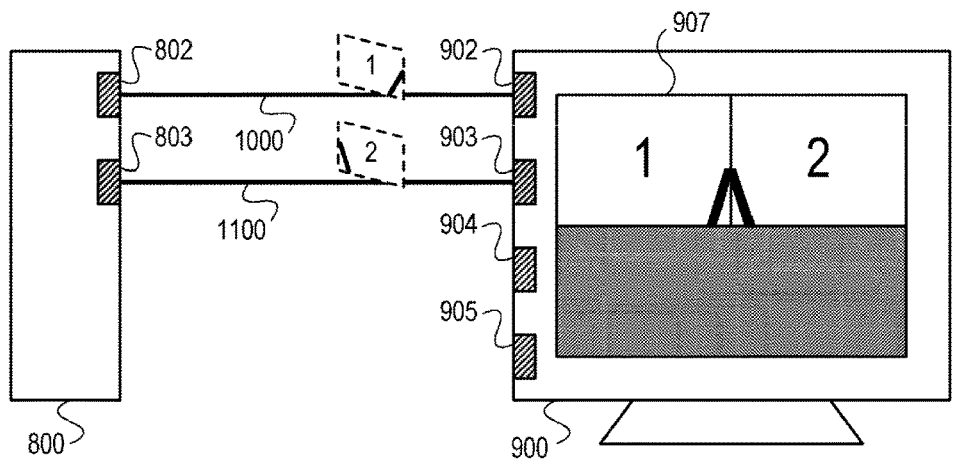
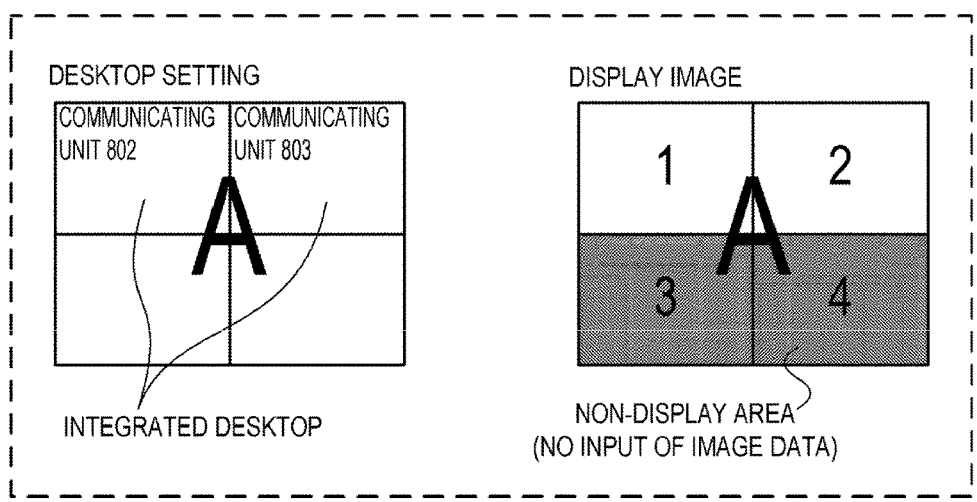

FIG. 16
| NUMBER OF USED INPUTS | LAYOUT INFORMATION (HORIZONTAL NUMBER, VERTICAL NUMBER) | POSITIONAL INFORMATION (HORIZONTAL POSITION, VERTICAL POSITION) | RESOLUTION INFORMATION (WIDTH, HEIGHT) | SCREEN CONFIGURATION |
|---|---|---|---|---|
| 1 | (1, 1) | (1, 1) | (w5, h5) | 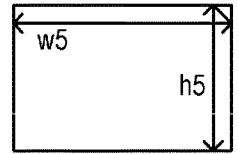 |
| 2 | (2, 1) | (1, 1) | (w6, h6) | 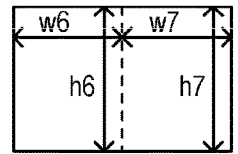 |
|   |   | (2, 1) | (w7, h7) |   |
| 3 | (3, 1) | (1, 1) | (w8, h8) | 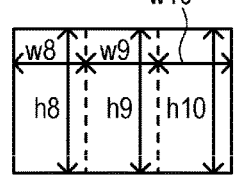 |
|   |   | (2, 1) | (w9, h9) |   |
|   |   | (3, 1) | (w10, h10) |   |
| 4 | (2, 2) | (1, 1) | (w1, h1) | 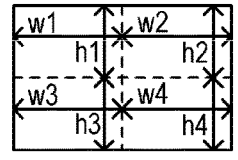 |
|   |   | (2, 1) | (w2, h2) |   |
|   |   | (1, 2) | (w3, h3) |   |
|   |   | (2, 2) | (w4, h4) |   |

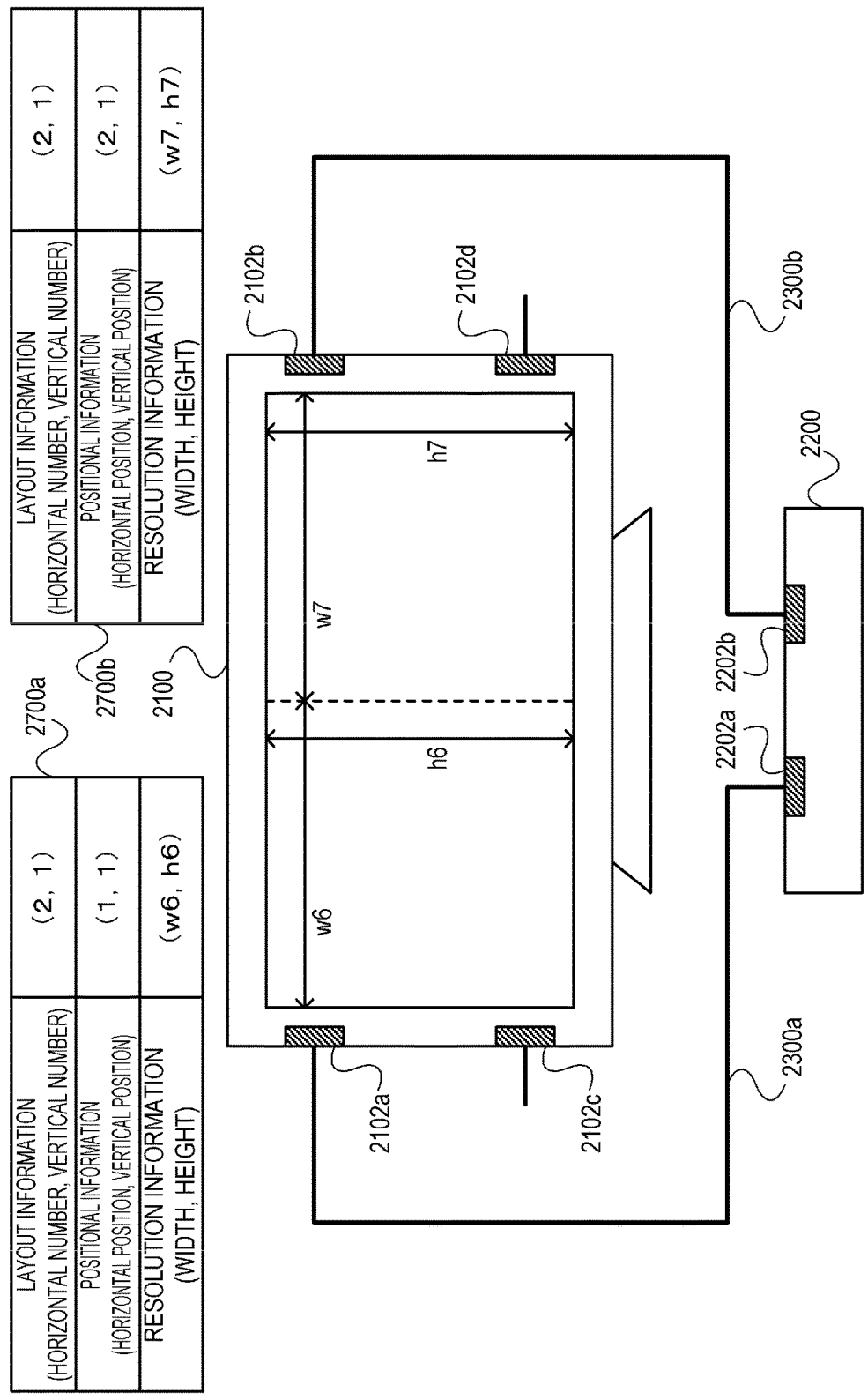

IMAGE OUTPUT APPARATUS, IMAGE DISPLAY APPARATUS, CONTROL METHOD OF IMAGE OUTPUT APPARATUS, AND CONTROL METHOD OF IMAGE DISPLAY APPARATUS

CROSS-REFERENCE TO RELATED APPLICATIONS:

This application is a national phase of International Application No. PCT/JP2015/004418 filed on Aug. 31, 2015, the entire disclosure of which is hereby incorporated by reference.

TECHNICAL FIELD

The present invention relates to an image output apparatus, an image display apparatus, a control method of an image output apparatus, and a control method of an image display apparatus.

BACKGROUND ART

In recent years, in order to increase a display size of an output image of a personal computer (PC), connection modes in which a plurality of monitors (image display apparatuses) are connected to the PC are popularly adopted. Accordingly, various settings are enabled with respect to a desktop that is formed on an operation system (OS) of a PC. Examples of a desktop include an extended desktop and an integrated desktop (refer to Patent Literature 1). An extended desktop is a desktop that is displayed on one monitor and an integrated desktop is a desktop that is displayed on two or more monitors.

In addition, there are monitors which include a plurality of input terminals (communicating units) and which are capable of combining input images input to the plurality of input terminals and displaying a high resolution image. Using such a monitor, a high resolution desktop can be displayed on the monitor. A specific example thereof will now be described.

An OS of a PC (image output apparatus) logically recognizes monitors in units of output terminals (communicating units). Therefore, in the case where four input terminals of a monitor are connected to four output terminals of a PC, an OS recognizes that four monitors are being connected although only one monitor physically exists.

In such a case, by adjusting settings of an integrated desktop so that one desktop is displayed on the four logically recognized monitors, a user can cause a high resolution desktop to be displayed on the one physically existing monitor.

Meanwhile, as a technique for maximizing capabilities of a monitor, a technique for changing capability information (information indicating capabilities of a monitor) of which a PC is notified by the monitor based on an input image is proposed (refer to Patent Literature 2).

However, in the conventional art described above, a user is unable to comprehend a correspondence relationship between a physically present monitor and a monitor that is logically recognized by an OS and, as a result, operations for setting up a desktop are complicated.

In addition, in the conventional art described above, no consideration has been given to connections between a monitor including a plurality of input terminals and a PC including a plurality of output terminals.

Therefore, there are cases where capabilities of a monitor cannot be maximized even in the case of using the conventional art described above.

An example will now be described of a case where a monitor includes four input terminals associated with four partial display areas obtained by quadrisecting a screen area and the monitor is connected to a PC using only two of the input terminals of the monitor. In this case, each of the two input terminal outputs capability information (resolution) related to the partial display area associated with the input terminal. In other words, an input terminal outputs capability information related to an area that is ¼ of the screen area. Therefore, an image with a resolution that is ¼ of a resolution of the screen is respectively output from the two output terminals (output terminals of the PC) connected to the two input terminals. As a result, an image with a resolution that is ½ of the resolution of the screen ends up being displayed on the monitor. More specifically, an image is only displayed in an area that is ½ of the area of the screen on the monitor.

CITATION LIST

Patent Literature

[PTL 1]
Japanese Translation of PCT Application No. 2013-516651
[PTL 2]
Japanese Patent Application Laid-open No. 2013-98903

SUMMARY OF INVENTION

Technical Problem

The present invention provides a technique that enables an image output apparatus and an image display apparatus including a plurality of communicating units to be suitably utilized. Specifically, the first present invention provides a technique capable of improving convenience in the case where an image output apparatus is connected to and used with an image display apparatus having a plurality of communicating units. The second present invention provides a technique that enables capabilities of an image display apparatus having a plurality of communicating units to be utilized more reliably and effectively in the case where an image output apparatus is connected to and used with the image display apparatus.

Solution to Problem

The present invention in its first aspect provides an image output apparatus connectable to an image display apparatus including a plurality of first communicating units that can be used to transmit and receive data to and from an external apparatus, an area of a screen of the image display apparatus being made up of a plurality of partial display areas capable of individually displaying an image, the plurality of partial display areas being associated with the plurality of first communicating units, the image output apparatus comprising:

a plurality of second communicating units that can be used to transmit and receive data to and from an external apparatus;

an acquiring unit configured to acquire, for each of the second communicating unit connected to the first communicating unit, from the first communicating unit connected to the second communicating unit, correspondence information that is information related to a partial display area associated with the first communicating unit;

a setting unit configured to set, for each of the second communicating unit, any of a plurality of output modes including a first output mode for outputting image data of an original image in any one of a plurality of partial image areas constituting an area of the original image; and an outputting unit configured to output, for each of the second communicating unit, image data based on an output mode set with respect to the second communicating unit using the second communicating unit, wherein the setting unit automatically sets the first output mode with respect to a second communicating unit for which the correspondence information has been acquired.

The present invention in its second aspect provides an image display apparatus comprising:

a plurality of first communicating units that can be used to transmit and receive data to and from an external apparatus;

a detecting unit configured to detect a first communicating unit used to transmit and receive data to and from the external apparatus;

a determining unit configured to determine a part of or all of an area of a screen as an allocation area with respect to the first communicating unit detected by the detecting unit;

a generating unit configured to generate, with respect to the first communicating unit detected by the detecting unit, allocation information which is information related to the allocation area determined with respect to the first communicating unit; and a storing unit configured to store the allocation information generated by the generating unit, wherein in the case where two or more first communicating units are detected by the detecting unit, the determining unit determines two or more allocation areas constituting the area of the screen with respect to the two or more first communicating units.

The present invention in its third aspect provides a control method of an image output apparatus connectable to an image display apparatus including a plurality of first communicating units that can be used to transmit and receive data to and from an external apparatus, an area of a screen of the image display apparatus being made up of a plurality of partial display areas capable of individually displaying an image, the plurality of partial display areas being associated with the plurality of first communicating units, the image output apparatus including a plurality of second communicating units that can be used to transmit and receive data to and from an external apparatus, the control method of an image output apparatus comprising:

an acquiring step of acquiring, for each of the second communicating unit connected to the first communicating unit, from the first communicating unit connected to the second communicating unit, correspondence information that is information related to a partial display area associated with the first communicating unit;

a setting step of setting, for each of the second communicating unit, any of a plurality of output modes including a first output mode for outputting image data of an original image in any one of a plurality of partial image areas constituting an area of the original image; and an outputting step of outputting, for each of the second communicating unit, image data based on an output mode set with respect to the second communicating unit using the second communicating unit, wherein in the setting step, the first output mode is automatically set with respect to a second communicating unit for which the correspondence information has been acquired.

The present invention in its fourth aspect provides a control method of an image display apparatus including a plurality of first communicating units that can be used to transmit and receive data to and from an external apparatus, the control method of an image display apparatus comprising:

a detecting step of detecting a first communicating unit used to transmit and receive data to and from the external apparatus;

a determining step of determining a part of or all of an area of a screen as an allocation area with respect to the first communicating unit detected in the detecting step;

a generating step of generating, with respect to the first communicating unit detected in the detecting step, allocation information which is information related to the allocation area determined with respect to the first communicating unit; and a storing step of storing the allocation information generated in the generating step, wherein in the determining step, in the case where two or more first communicating units are detected in the detecting step, two or more allocation areas constituting the area of the screen are determined with respect to the two or more first communicating units.

The present invention in its fifth aspect provides a non-transitory computer readable medium that stores a program, wherein the program causes a computer to execute a control method of an image output apparatus connectable to an image display apparatus including a plurality of first communicating units that can be used to transmit and receive data to and from an external apparatus, an area of a screen of the image display apparatus being made up of a plurality of partial display areas capable of individually displaying an image, the plurality of partial display areas being associated with the plurality of first communicating units, the image output apparatus including a plurality of second communicating units that can be used to transmit and receive data to and from an external apparatus, the control method of an image output apparatus comprising:

an acquiring step of acquiring, for each of the second communicating unit connected to the first communicating unit, from the first communicating unit connected to the second communicating unit, correspondence information that is information related to a partial display area associated with the first communicating unit;

a setting step of setting, for each of the second communicating unit, any of a plurality of output modes including a first output mode for outputting image data of an original image in any one of a plurality of partial image areas constituting an area of the original image; and an outputting step of outputting, for each of the second communicating unit, image data based on an output mode set with respect to the second communicating unit using the second communicating unit, wherein in the setting step, the first output mode is automatically set with respect to a second communicating unit for which the correspondence information has been acquired.

The present invention in its sixth aspect provides a non-transitory computer readable medium that stores a program, wherein the program causes a computer to execute a control method of an image display apparatus including a plurality of first communicating units that can be used to transmit and receive data to and from an external apparatus, the control method of an image display apparatus comprising:

a detecting step of detecting a first communicating unit used to transmit and receive data to and from the external apparatus;

a determining step of determining a part of or all of an area of a screen as an allocation area with respect to the first communicating unit detected in the detecting step;

a generating step of generating, with respect to the first communicating unit detected in the detecting step, allocation information which is information related to the allocation area determined with respect to the first communicating unit; and a storing step of storing the allocation information generated in the generating step, wherein in the determining step, in the case where two or more first communicating units are detected in the detecting step, two or more allocation areas constituting the area of the screen are determined with respect to the two or more first communicating units.

Advantageous Effects of Invention

According to the present invention, an image output apparatus and an image display apparatus including a plurality of communicating units can be suitably utilized. Specifically, convenience in the case where an image output apparatus is connected to and used with an image display apparatus having a plurality of communicating units can be improved. In addition, capabilities of an image display apparatus having a plurality of communicating units can be utilized more reliably and effectively in the case where an image output apparatus is connected to and used with the image display apparatus.

Further features of the present invention will become apparent from the following description of exemplary embodiments with reference to the attached drawings.

BRIEF DESCRIPTION OF DRAWINGS

FIG. 7 is a diagram showing an example of a configuration of an image display system according to the second embodiment;

FIG. 8 is a diagram showing an example of a problem that is solved in the second embodiment;

FIG. 16 is a diagram showing an example of correspondence relationship information according to the third embodiment;

FIG. 17 is a diagram showing an example of allocation information that is generated in the third embodiment;

DESCRIPTION OF EMBODIMENTS

<First Embodiment>

Hereinafter, an image display system and a control method thereof according to a first embodiment of the present invention will be described.

(Configuration of Image Display System)

A configuration of an image display system according to the present embodiment will be concisely described.

Figure 1:
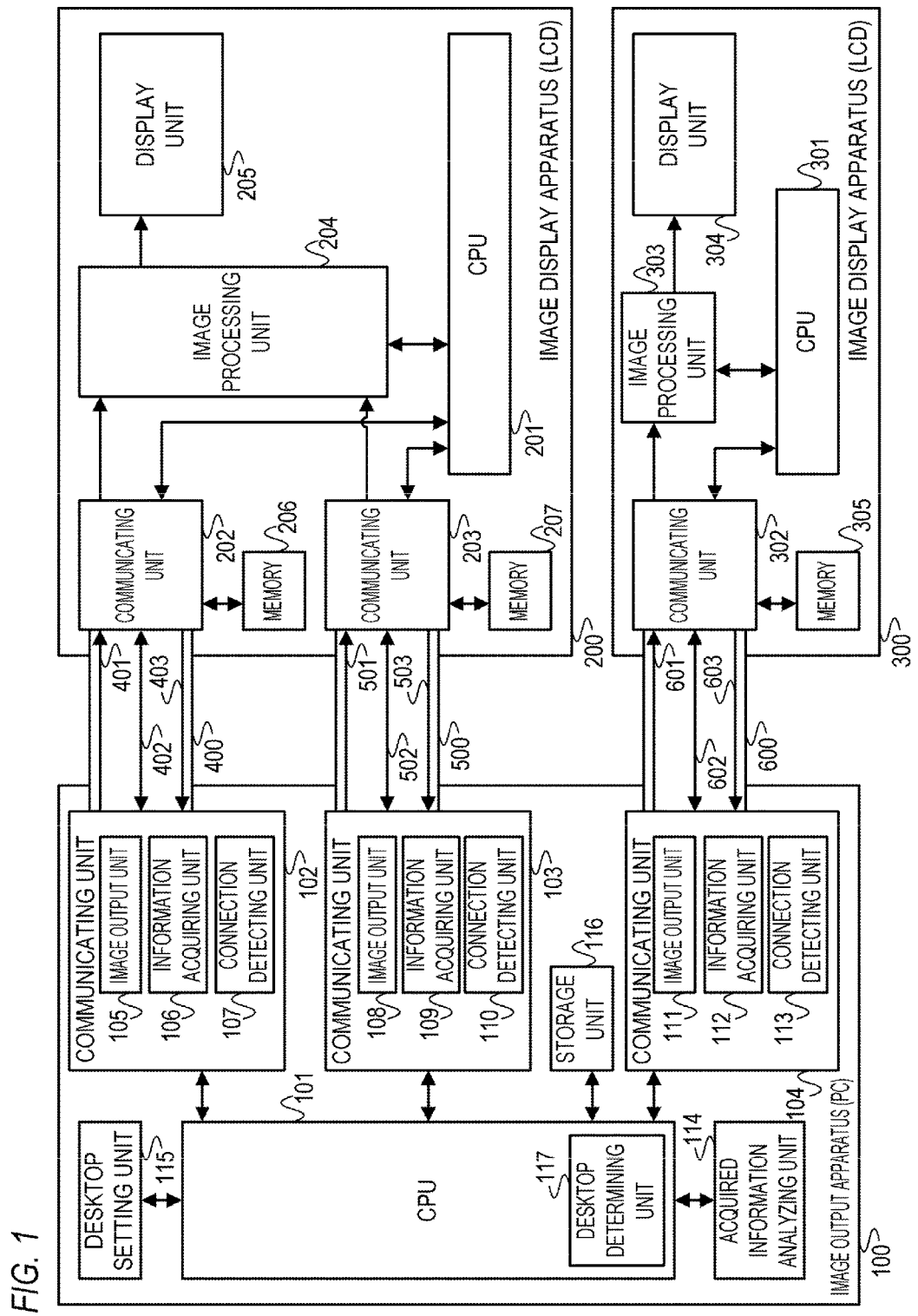
FIG. 1 is a block diagram showing an example of a configuration of an image display system according to a first embodiment.

FIG. 1 is a block diagram showing an example of a configuration of an image display system according to the present embodiment.

As shown in FIG. 1, the image display system according to the present embodiment includes an image output apparatus 100, an image display apparatus 200, and an image display apparatus 300.

The image output apparatus 100 is an apparatus which can be connected to external apparatuses including an image display apparatus and which is capable of outputting image data. As the image output apparatus 100, for example, a personal computer (PC) can be used. In the present embodiment, an example of a case where a PC is used as the image output apparatus 100 will be described. Hereinafter, the image output apparatus 100 will be described as a "PC 100".

The image display apparatuses 200 and 300 are apparatuses which can be connected to external apparatuses including an image output apparatus and which are capable of displaying an image based on image data. As the image display apparatuses 200 and 300, a liquid crystal display apparatus (LCD), an organic EL (Electro Luminescence)

display apparatus, a projector, and the like can be used. In the present embodiment, an example of a case where LCDs are used as the image display apparatuses 200 and 300 will be described. Hereinafter, the image display apparatus 200 will be described as an "LCD 200" and the image display apparatus 300 will be described as an "LCD 300".

In FIG. 1, the LCDs 200 and 300 are connected to the PC 100. Specifically, the PC 100 is connected to the LCD 200 using cables 400 and 500 and the PC 100 is connected to the LCD 300 using a cable 600. As the cables 400, 500, and 600, cables capable of bidirectional communication can be used. For example, as the cables 400, 500, and 600, a cable in compliance with the Display Port (DP) standard, a cable in compliance with the HDMI standard, a cable in compliance with the DVI standard, and the like can be used. In the present embodiment, an example of a case where a cable in compliance with the DP standard is used as the cables 400, 500, and 600 will be described. Hereinafter, the cable 400 will be described as a "DP 400", the cable 500 will be described as a "DP 500", and the cable 600 will be described as a "DP 600".

(Configuration of PC 100)

A configuration of the PC 100 will now be described.

As shown in FIG. 1, the PC 100 includes a CPU 101, communicating units 102, 103, and 104, an acquired information analyzing unit 114, a desktop setting unit 115, a storage unit 116, and the like.

The CPU (Central Processing Unit) 101 controls operations of respective functional units included in the PC 100 by deploying and executing an OS program (a program of an OS) stored in the storage unit 116. In addition, the CPU 101 includes a desktop determining unit 117. Specifically, a function of the desktop determining unit 117 is realized as the CPU 101 deploys and executes a determination program stored in the storage unit 116.

The communicating units 102, 103, and 104 are communicating units (second communicating units) that can be used to transmit and receive data to and from an external apparatus.

In FIG. 1, the communicating unit 102 is connected to a communicating unit 202 of the LCD 200 using the DP 400. Therefore, the communicating unit 102 is capable of transmitting and receiving data to and from the communicating unit 202 via the DP 400.

In addition, in FIG. 1, the communicating unit 103 is connected to a communicating unit 203 of the LCD 200 using the DP 500. Therefore, the communicating unit 103 is capable of transmitting and receiving data to and from the communicating unit 203 via the DP 500.

Furthermore, in FIG. 1, the communicating unit 104 is connected to a communicating unit 302 of the LCD 300 using the DP 600. Therefore, the communicating unit 104 is capable of transmitting and receiving data to and from the communicating unit 302 via the DP 600.

The communicating unit 102 includes an image output unit 105, an information acquiring unit 106, a connection detecting unit 107, and the like. The communicating unit 103 includes an image output unit 108, an information acquiring unit 109, a connection detecting unit 110, and the like. In addition, the communicating unit 104 includes an image output unit 111, an information acquiring unit 112, a connection detecting unit 113, and the like.

The image output units 105, 108, and 111 generate image data and output the generated image data in accordance with instructions from the CPU 101. For example, image data is generated and output per frame. The image output units 105, 108, and 111 are constituted by, for example, a GPU (Graphic Processing Unit). In FIG. 1, image data output from the image output unit 105 is transmitted to the communicating unit 202 of the LCD 200 via a Lane 401 of the DP 400. Image data output from the image output unit 108 is transmitted to the communicating unit 203 of the LCD 200 via a Lane 501 of the DP 500. Image data output from the image output unit 111 is transmitted to the communicating unit 302 of the LCD 300 via a Lane 601 of the DP 600.

The information acquiring units 106, 109, and 112 attempt to acquire correspondence information from a connected external apparatus. Specifically, the information acquiring units 106, 109, and 112 acquire a Display ID (Display Identification Data) as defined in the VESA standard from a connected external apparatus. In FIG. 1, the information acquiring unit 106 acquires a Display ID from the communicating unit 202 of the LCD 200 via an AUXCH (Auxiliary Channel) 402 of the DP 400. The information acquiring unit 109 acquires a Display ID from the communicating unit 203 of the LCD 200 via an AUXCH (Auxiliary Channel) 502 of the DP 500. The information acquiring unit 112 acquires a Display ID from the communicating unit 302 of the LCD 300 via an AUXCH (Auxiliary Channel) 602 of the DP 600.

Image display apparatuses include those having the following features.

A plurality of communicating units (first communicating units) that can be used to transmit and receive data to and from an external apparatus are provided.

An area (displayable area) of a screen is made up of a plurality of partial display areas capable of individually displaying images.

The plurality of partial display areas are associated with the plurality of first communicating units.

The correspondence information described above is information related to partial display areas.

In the case where a communicating unit connected to a second communicating unit (a communicating unit of the PC 100) is a first communicating unit, a Display ID that is correspondence information related to a partial display area associated with the first communicating unit is acquired. In the case where the communicating unit connected to a second communicating unit is not a first communicating unit, a Display ID that is not correspondence information is acquired. Specifically, in the case where the communicating unit connected to a second communicating unit is a first communicating unit, a Display ID including screen configuration information related to a partial display area associated with the first communicating unit is acquired. In the case where the communicating unit connected to a second communicating unit is not a first communicating unit, a Display ID that does not include screen configuration information is acquired. Screen configuration information can also be referred to as correspondence information. Screen configuration information is, for example, a Tiled Display Topology Block that is defined in the VESA standard.

The connection detecting unit 107 detects a logical connection of an external apparatus to the communicating unit 102 by monitoring an HPD (Hot Plug Detect) signal that is supplied using an HPD line 403 of the DP 400. The connection detecting unit 107 detects that a connection with the external apparatus has been established in the case of receiving a high voltage level (H level) HPD signal via the HPD line 403. In addition, the connection detecting unit 107 detects a disconnection from the external apparatus in the case of receiving a low voltage level (L level) HPD signal.

The connection detecting units 110 and 113 have similar functions to the connection detecting unit 107. The connection detecting unit 110 detects a logical connection of an external apparatus to the communicating unit 103 by monitoring an HPD signal that is supplied using an HPD line 503 of the DP 500. The connection detecting unit 113 detects a logical connection of an external apparatus to the communicating unit 104 by monitoring an HPD signal that is supplied using an HPD line 603 of the DP 600.

Moreover, the connection detecting units 107, 110, and 113 may detect physical connections of an external apparatus to the communicating units 102, 103, and 104.

The acquired information analyzing unit 114 analyzes a Display ID acquired by the information acquiring units 106, 109, and 112 of the communicating units 102, 103, and 104.

The desktop setting unit 115 performs desktop setting in accordance with an instruction from the desktop determining unit 117. Desktop setting is a process of setting a desktop for each screen that is recognized by the PC 100. Desktops include an extended desktop, an integrated desktop, and the like. An extended desktop is a desktop that is displayed on one screen and an integrated desktop is a desktop that is displayed on two or more screens (virtual screens). The desktop setting can also be described as a process for setting any of a plurality of output modes for each second communicating unit to which an external apparatus is connected. Output modes include a first output mode that outputs image data of an original image in one of a plurality of partial image areas constituting an area of the original image and a second output mode that outputs image data corresponding to one screen. Image data of an integrated desktop is output in the first output mode and image data of an extended desktop is output in the second output mode.

The storage unit 116 includes a nonvolatile memory and a volatile memory. The volatile memory is used as a work memory in the case where, for example, the CPU 101 performs a process. Various programs to be executed on the PC 100 are stored in the nonvolatile memory. For example, an OS program and a determination program are recorded in the nonvolatile memory. In addition, a program for a desktop configuration process (to be described later), programs for applications, data used in applications and various processes, and the like are also recorded in the nonvolatile memory. As the nonvolatile memory, a magnetic disk, an optical disk, a semiconductor memory, or the like can be used. The programs recorded in the storage unit 116 may be either rewritable or non-rewritable.

The desktop determining unit 117 issues instructions to the desktop setting unit 115 based on a result of an analysis by the acquired information analyzing unit 114.

(Configuration of LCD 200)

A configuration of the LCD 200 will now be described.

As shown in FIG. 1, the LCD 200 includes a CPU 201, communicating units 202 and 203, an image processing unit 204, a display unit 205, memories 206 and 207, and the like.

The CPU 201 controls operations of the respective functional units included in the LCD 200 by deploying and executing a control program stored in a storage unit (not shown).

The communicating units 202 and 203 are communicating units (first communicating units) that can be used to transmit and receive data to and from an external apparatus.

In FIG. 1, the communicating unit 202 is capable of transmitting and receiving data to and from the communicating unit 102 of the PC 100 via the DP 400. The communicating unit 202 outputs image data supplied from the communicating unit 102 of the PC 100 via the Lane 401 of the DP 400 to the image processing unit 204. In the case where acquisition of information is requested by the communicating unit 102 of the PC 100, the communicating unit 202 outputs a Display ID corresponding to the communicating unit 202 to the communicating unit 102 via the AUXCH 402 of the DP 400. The Display ID corresponding to the communicating unit 202 is stored in the memory 206 and is therefore read from the memory 206. In the case where a power supply state of the LCD 200 is an on state, the communicating unit 202 outputs an H level HPD signal to the communicating unit 102 via the HPD line 403 of the DP 400. Meanwhile, in the case where a power supply state of the LCD 200 is an off state, the communicating unit 202 outputs an L level HPD signal to the communicating unit 102 via the HPD line 403 of the DP 400.

The communicating unit 203 is capable of transmitting and receiving data to and from the communicating unit 103 of the PC 100 via the DP 500. Since a function of the communicating unit 203 is similar to the function of the communicating unit 202, a description thereof will be omitted. Moreover, a Display ID corresponding to the communicating unit 203 is stored in the memory 207 and is therefore read from the memory 207.

The image processing unit 204 performs prescribed image processing on image data output from the communicating units 202 and 203 and outputs the processed image data. Prescribed image processing is, for example, a format conversion process for converting a format of image data into a format that can be displayed on the display unit 205.

In addition, the image processing unit 204 controls an emission state of a light source (backlight) of the display unit 205.

Figure 2:
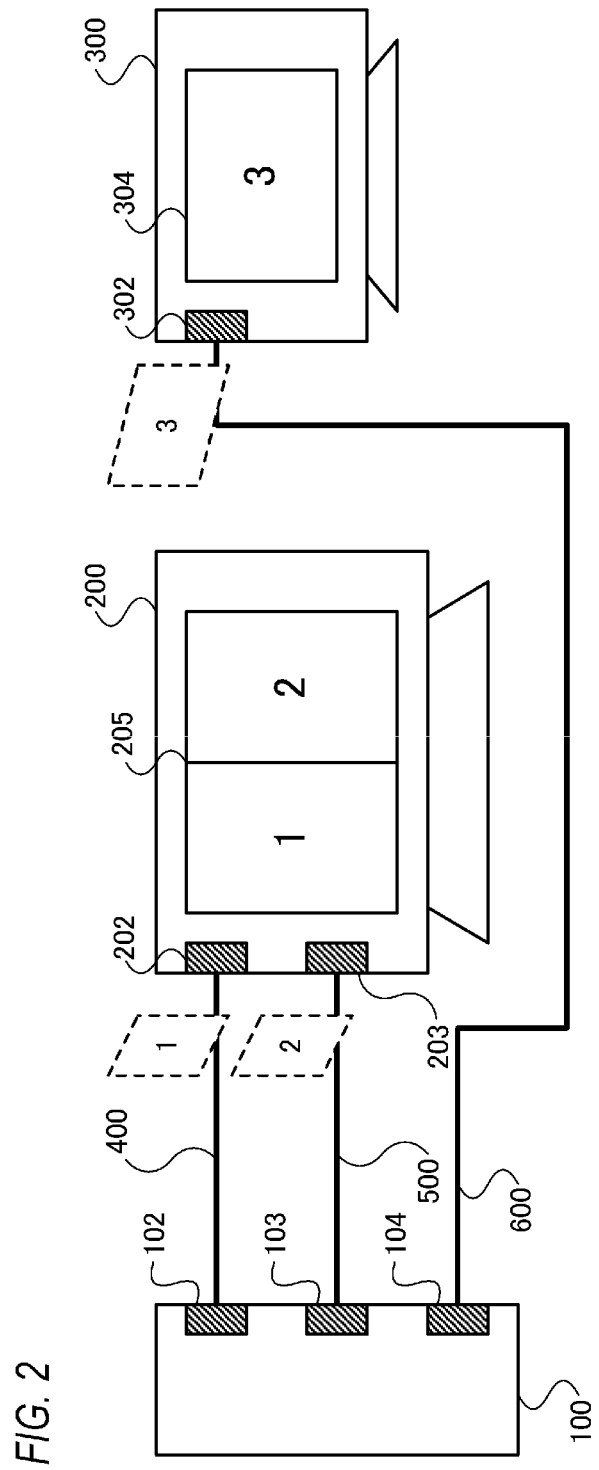
FIG. 2 is a diagram showing an example of a configuration of an image display system according to the first embodiment.

As shown in FIG. 2, a screen area of the LCD 200 is made up of two partial display areas 1 and 2 that are laterally arranged side by side. An image based on the image data output from the communicating unit 202 is displayed in a left partial display area 1 and an image based on the image data output from the communicating unit 203 is displayed in a right partial display area 2. In other words, the partial display area 1 is associated with the communicating unit 202 and the partial display area 2 is associated with the communicating unit 203. Therefore, a Display ID that is correspondence information related to the partial display area 1 is output from the communicating unit 202 and a Display ID that is correspondence information related to the partial display area 2 is output from the communicating unit 203. In addition, at the image processing unit 204, a format of the image data output from the communicating unit 202 is converted into a format that can be displayed in the partial display area 1, and a format of the image data output from the communicating unit 203 is converted into a format that can be displayed in the partial display area 2.

The display unit 205 includes a liquid crystal display panel and a backlight. The display unit 205 displays an image based on image data output from the image processing unit 204.

The memory 206 is a nonvolatile memory storing a Display ID corresponding to the communicating unit 202, and the memory 207 is a nonvolatile memory storing a Display ID corresponding to the communicating unit 203. For example, the Display IDs are recorded in advance in the memories 206 and 207 upon shipment of the LCD 200 from a factory, prior to shipment of the LCD 200 from a factory, or the like.

<LCD 300>

A configuration of the LCD 300 will now be described.

As shown in FIG. 1, the LCD 300 includes a CPU 301, a communicating unit 302, an image processing unit 303, a display unit 304, a memory 305, and the like.

The CPU 301 controls operations of the respective functional units included in the LCD 300 by deploying and executing a control program stored in a storage unit (not shown).

The communicating unit 302 is a communicating unit that can be used to transmit and receive data to and from an external apparatus. The communicating unit 302 is capable of transmitting and receiving data to and from the communicating unit 104 of the PC 100 via the DP 600. Since a function of the communicating unit 302 is similar to the function of the communicating units 202 and 203, a description thereof will be omitted. Moreover, a Display ID corresponding to the communicating unit 302 is stored in the memory 305 and is therefore read from the memory 305. In addition, the LCD 300 only includes one communicating unit 302 and a Display ID corresponding to the communicating unit 302 is not correspondence information.

The image processing unit 303 performs prescribed image processing on image data output from the communicating unit 302 and outputs the processed image data. Prescribed image processing is, for example, a format conversion process for converting a format of image data into a format that can be displayed on the display unit 304.

In addition, the image processing unit 303 controls an emission state of a light source (backlight) of the display unit 304.

As shown in FIG. 2, a screen area 3 of the LCD 300 is not divided into a plurality of partial display areas. In addition, an image based on the image data output from the communicating unit 302 is displayed in an entire screen area. Therefore, in the image processing unit 303, a format of the image data output from the communicating unit 302 is converted into a format that can be displayed in the screen area 3.

The display unit 304 includes a liquid crystal display panel and a backlight. The display unit 304 displays an image based on the image data output from the image processing unit 303.

The memory 305 is a nonvolatile memory storing a Display ID corresponding to the communicating unit 302. For example, the Display ID is recorded in advance in the memory 305 upon shipment of the LCD 300 from a factory, prior to shipment of the LCD 300 from a factory, or the like.

(Configuration of DP)

Configurations of the DPs 400, 500, and 600 will be described.

Moreover, while only signal lines necessary for performing the processes according to the present embodiment will be described in the present embodiment, general cables in compliance with the Display Port standard can be used as the DPs 400, 500, and 600.

The DP 400 includes signal lines such as the Lane 401, the AUXCH 402, and the HPD line 403. The DP 500 includes signal lines such as the Lane 501, the AUXCH 502, and the HPD line 503. The DP 600 includes signal lines such as the Lane 601, the AUXCH 602, and the HPD line 603.

The Lane 401 is a signal line used to transmit image data from the PC 100 to the LCD 200. The Lane 401 includes a Main Link Lane 0, a Main Link Lane 1, a Main Link Lane 2, and a Main Link Lane 3.

The AUXCH 402 is a signal line used to transmit a Display ID from the LCD 200 to the PC 100. A communication system for transmission of the Display ID using the AUXCH 402 is in compliance with the I2C standard.

The HPD line 403 is a signal line used to transmit an HPD signal from the LCD 200 to the PC 100.

(Display ID)

A Display ID according to the present embodiment will be described.

Moreover, it is assumed that description contents of a Display ID according to the present embodiment are defined by the VESA (Video Electronics Standards Association) standard.

Hereinafter, an example of a case where a version of a Display ID is 1.3 will be described.

A Display ID is data including corresponding format information such as a basic display parameter of an image display apparatus and a resolution of image data that can be input to the image display apparatus. In addition, a Display ID of an image display apparatus whose screen area is made up of a plurality of partial display areas includes screen configuration information that is correspondence information. For example, a Tiled Display Topology Data Block (a Tiled block) defined by the VESA standard is included as screen configuration information. In the present embodiment, an example of a case where screen configuration information is a Tiled block will be described. A Display ID corresponding to the communicating units 202 and 203 is data including a Tiled block.

(Tiled block)

A Tiled block 701 will now be described with reference to FIG. 3.

Figure 3:
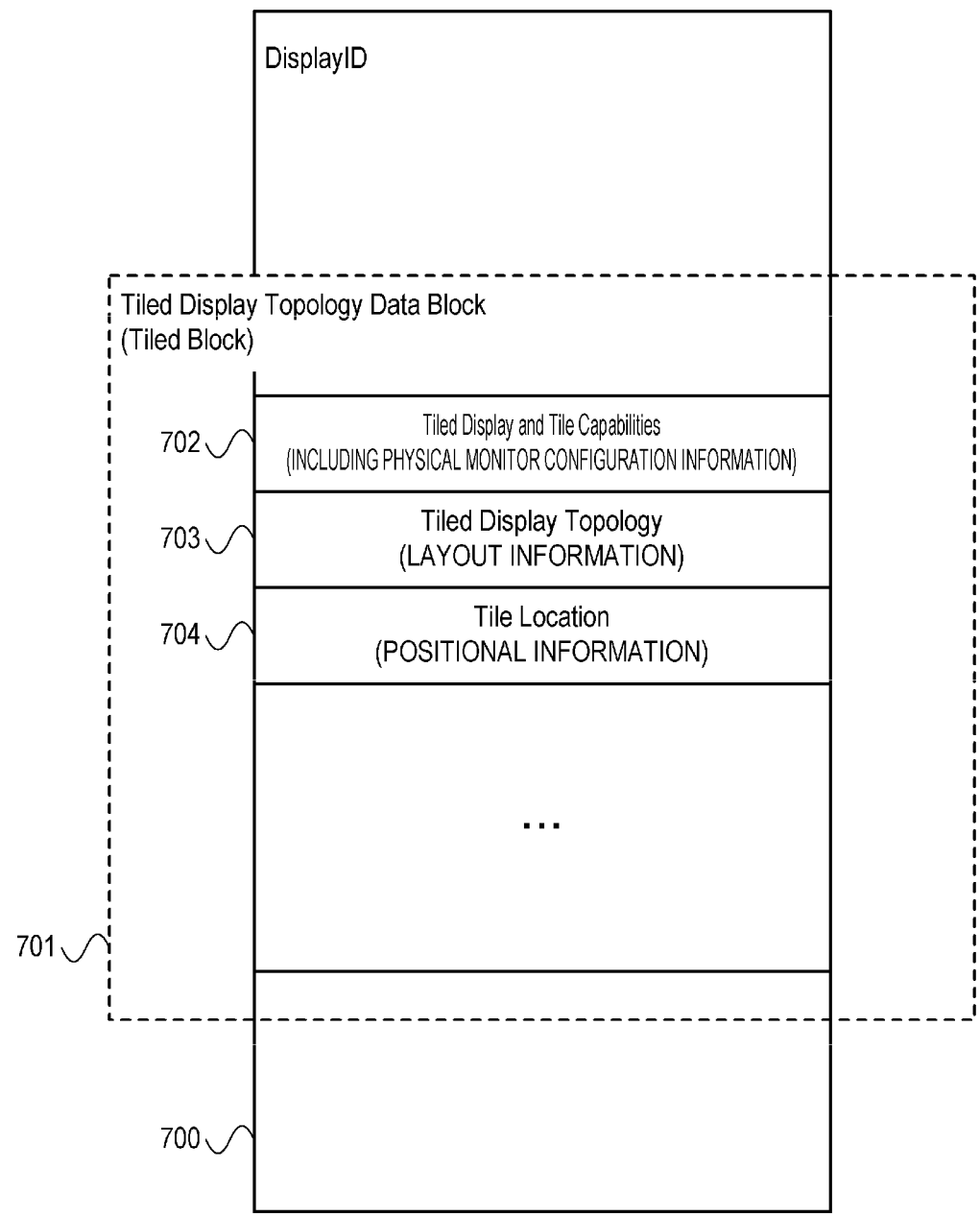
FIG. 3 is a diagram showing an example of a Display ID according to the first embodiment.

As shown in FIG. 3, the Tiled block 701 is a part of a Display ID 700. As shown in FIG. 3, the Tiled block 701 includes Tiled Display and Tile Capabilities 702, Tiled Display Topology 703, and a Tile Location 704.

Moreover, in the present embodiment only a part of information (data) will be described and a description of other information included in a display ID or a Tiled block will be omitted.

The Tiled Display and Tile Capabilities 702 are information which represents an image display apparatus and which indicates whether or not a screen area is constituted by a plurality of partial display areas. In the present embodiment, the Tiled Display and Tile Capabilities will be referred to as "physical monitor configuration information". In the present embodiment, "True" is used as physical monitor configuration information with respect to a communicating unit corresponding to a partial display area. In addition, for a communicating unit not corresponding to a partial display area, "False" is used as physical monitor configuration information or a Tiled block is not used as physical monitor configuration information. In the present embodiment, the LCD 200 is one image display apparatus and a screen area of the LCD 200 is constituted by a plurality of partial display areas. Therefore, "True" is used as the physical monitor configuration information corresponding to the communicating units 202 and 203.

The Tiled Display Topology 703 is information representing the number of partial display areas in a horizontal direction and the number of partial display areas in a vertical direction. In the present embodiment, the Tiled Display Topology is referred to as "layout information". Layout information is also number information representing a total number of partial display areas. A screen area of the LCD 200 is constituted by two partial display areas laterally arranged side by side. Therefore, as layout information corresponding to the communicating units 202 and 203, layout information is used in which the number of partial display areas in the horizontal direction is 2 and the number of partial display areas in the vertical direction is 1.

The Tile Location 704 is information representing a relative position of a partial display area corresponding to a first communicating unit with respect to a screen area (a plurality of partial display areas). In the present embodiment, the Tile Location is referred to as "positional information". The partial display area corresponding to the communicating unit 202 is a leftmost and topmost partial display area. Therefore, (position in horizontal direction, position in vertical direction)=(1, 1) is used as positional information corresponding to the communicating unit 202. In addition, the partial display area corresponding to the communicating unit 203 is a second from left and topmost partial display area. Therefore, (2, 1) is used as positional information corresponding to the communicating unit 203.

A partial display area corresponding to a first communicating unit is represented by the layout information and the positional information described above. Therefore, the layout information and the positional information can also be collectively referred to as "area information representing a partial display area".

Moreover, a Tiled block may include area information as information that differs from layout information and positional information.

(Desktop Configuration Process)

A desktop configuration process performed by the PC 100 will now be described with reference to FIG. 4.

Figure 4:
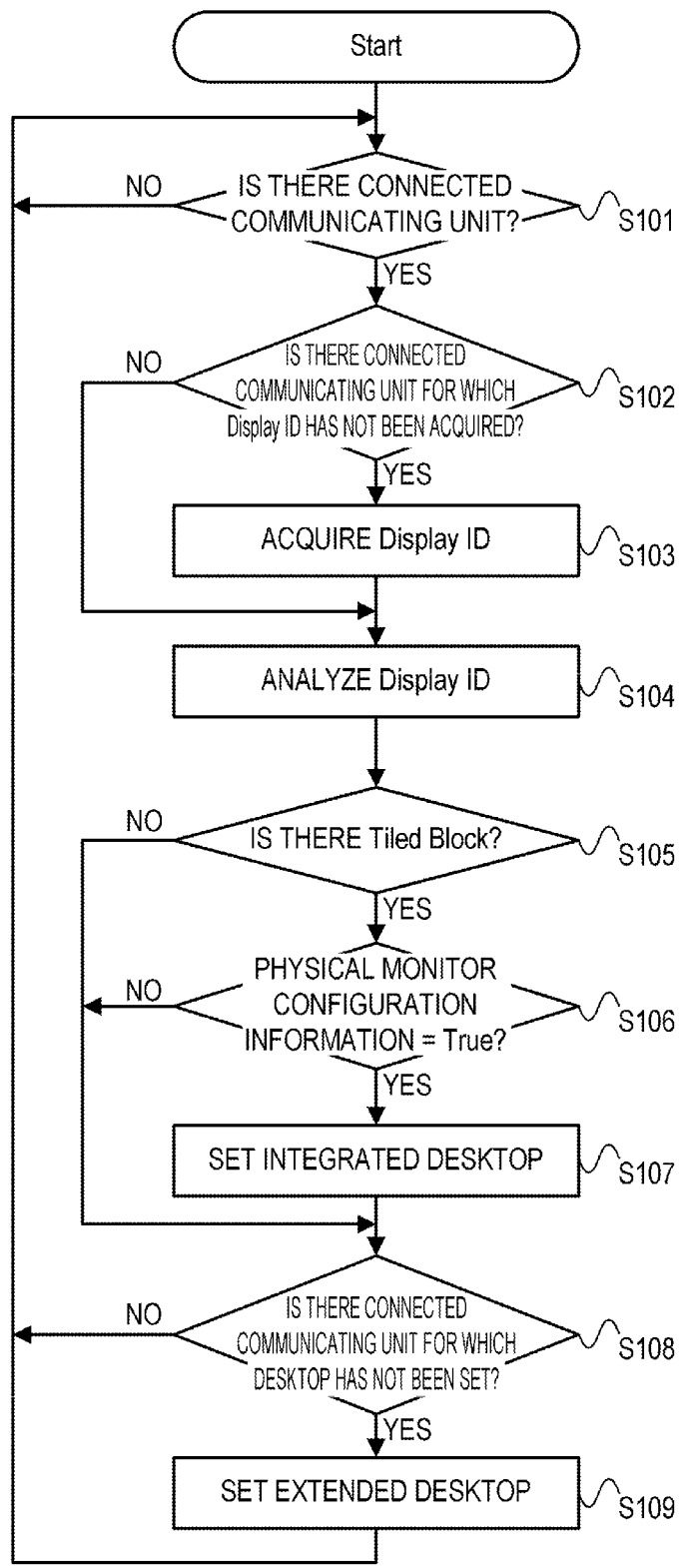
FIG. 4 is a flow chart showing an example of a desktop configuration process according to the first embodiment.

FIG. 4 is a flow chart for describing an example of the desktop configuration process according to the present embodiment.

The desktop configuration process is a process of automatically setting an output mode and a desktop to appropriate states in the case where connection states of the communicating units 102, 103, and 104 of the PC 100 change. A start of the desktop configuration process is triggered by, for example a power supply state of the PC 100 being switched from an off state to an on state. In the case where the power supply state of the PC 100 is switched from an off state to an on state, the CPU 101 deploys and executes a desktop configuration program (a program for the desktop configuration process) stored in the storage unit 116. Accordingly, the desktop configuration process is started.

It should be understood that the processing flow presented below is simply an example and a processing flow of the desktop configuration process according to the present embodiment is not limited to the following processing flow.

First, for each of the three communicating units 102, 103, and 104, the CPU 101 determines whether or not an external apparatus has been connected to the communicating unit (S101). Whether or not an external apparatus has been connected to the communicating unit 102 is determined based on a result of detection (a result of monitoring) by the connection detecting unit 107. Whether or not an external apparatus has been connected to the communicating unit 103 is determined based on a result of detection by the connection detecting unit 110. Whether or not an external apparatus has been connected to the communicating unit 104 is determined based on a result of detection by the connection detecting unit 113. In the present embodiment, a communicating unit to which an external apparatus is determined to be connected will be referred to as a "connected communicating unit". In the case where a connected communicating unit is present (S101: YES), processes of S102 and thereafter are performed with respect to the connected communicating unit. In the case where a connected communicating unit is not present (S101: NO), the process of S101 is repeated until a connected communicating unit is detected.

A connected communicating unit may be detected in the case where an external apparatus is initially connected to a communicating unit, in the case where an external apparatus connected to a communicating unit is changed, and the like. Therefore, a Display ID is not always acquired from the external apparatus connected to the connected communicating unit.

In consideration thereof, in S102, the CPU 101 determines whether or not a Display ID has been acquired with respect to a connected communicating unit. In the case where the communicating unit 102 is a connected communicating unit, a determination is made on whether or not a Display ID has been acquired by the information acquiring unit 106. In the case where the communicating unit 103 is a connected communicating unit, a determination is made on whether or not a Display ID has been acquired by the information acquiring unit 109. In the case where the communicating unit 104 is a connected communicating unit, a determination is made on whether or not a Display ID has been acquired by the information acquiring unit 112. In the case where there is a connected communicating unit for which a Display ID has not been acquired (S102: YES), the process is advanced to S103. In the case where there is no connected communicating unit for which a Display ID has not been acquired (S102: NO), the process is advanced to S104.

In S103, the CPU 101 instructs a connected communicating unit for which a Display ID has not been acquired to acquire the Display ID. The connected communicating unit instructed to acquire the Display ID uses the information acquiring unit of the connected communicating unit to acquire the Display ID from the external apparatus being connected to the connected communicating unit and outputs the acquired Display ID to the CPU 101. Subsequently, the process is advanced to S104.

In S104, the acquired information analyzing unit 114 analyzes the Display ID acquired by the connected communicating unit. Subsequently, the process is advanced to S105.

In S105, based on a result of the analysis in S104, the CPU 101 determines whether or not a Tiled block (screen configuration information) is included in the Display ID acquired by the connected communicating unit. In the case where there is a connected communicating unit for which a Tiled block has been acquired (S105: YES), the process is advanced to S106. In the case where there is no connected communicating unit for which a Tiled block has been acquired (S105: NO), the process is advanced to S108.

In the case of performing desktop setting in accordance with a user operation, a user usually performs an operation for desktop setting so that an image corresponding to one screen (one desktop) is displayed on one screen that is physically present. Therefore, an integrated desktop should be set as a desktop of a connected communicating unit for which correspondence information (a Tiled block whose physical monitor configuration information is "True") has been acquired. In other words, the first output mode should be set as an output mode of a connected communicating unit for which correspondence information has been acquired.

To this end, in S106, the desktop determining unit 117 determines whether or not an integrated desktop should be set as a desktop of a connected communicating unit for which a Tiled block has been acquired. In the present embodiment, a determination on whether or not an integrated desktop should be set is made based on a result of the analysis in S104. Specifically, the desktop determining unit 117 determines whether or not physical monitor configuration information included in the acquired Tiled block is "True". With respect to a connected communicating unit for which the acquired physical monitor configuration information is "True", the Tiled block is determined to be correspondence information and a determination that an integrated desktop should be set is made. With respect to a connected communicating unit for which the acquired physical monitor configuration information is "False", the Tiled block is determined not to be correspondence information and a determination that an integrated desktop should not be set is made. In the case where there is a connected communicating unit for which a determination that an integrated desktop should be set is made (S106: YES), the process is advanced to S107. In the case where there is no connected communicating unit for which a determination that an integrated desktop should be set is made (S106: NO), the process is advanced to S108.

Alternatively, whether or not a Tiled block is correspondence information may be determined without using physical monitor configuration information. For example, whether or not a Tiled block is correspondence information may be determined using layout information or positional information.

In S107, the desktop determining unit 117 outputs an instruction to the desktop setting unit 115 to set an integrated desktop with respect to a connected communicating unit for which a determination that an integrated desktop should be set has been made in S106. In accordance with the instruction from the desktop determining unit 117, the desktop setting unit 115 sets an integrated desktop with respect to a connected communicating unit for which a determination that an integrated desktop should be set has been made in S106. Subsequently, the process is advanced to S108.

As described above, in the present embodiment, an integrated desktop (first output mode) is automatically set with respect to a connected communicating unit for which correspondence information has been acquired. Accordingly, an image output apparatus and an image display apparatus including a plurality of communicating units can now be suitably utilized. Specifically, convenience in the case where an image output apparatus is connected to and used with an image display apparatus having a plurality of communicating units can be improved. More specifically, the hassle for the user to perform an operation in order to set a desktop can be eliminated.

In the present embodiment, for each connected communicating unit, image data based on a desktop (output mode) that is set with respect to the connected communicating unit is output using the connected communicating unit (image output unit). Specifically, the image output unit included in the connected communicating unit generates image data of the desktop set with respect to the connected communicating unit and outputs the generated image data. Therefore, the image output unit included in the connected communicating unit for which an integrated desktop is set generates image data of the integrated desktop (image data of a part of the integrated desktop) and outputs the generated image data.

In this case, correspondence information is necessary in order to set an integrated desktop (the first output mode) and generate image data of the integrated desktop. Specifically, layout information (the number of partial display areas in a horizontal direction and the number of partial display areas in a vertical direction) is necessary. Therefore, in the present embodiment, the desktop determining unit 117 outputs layout information acquired by the connected communicating unit that is an object of setting an integrated desktop to the desktop setting unit 115. In the example shown in FIG. 1, the layout information corresponding to the communicating unit 202 is output as information to be used in the case of setting an integrated desktop to the communicating unit 102. In addition, the layout information corresponding to the communicating unit 203 is output as information to be used in the case of setting an integrated desktop to the communicating unit 102.

It should be noted that various conventional techniques can be used as a setting method of an integrated desktop.

In S108, the CPU 101 determines whether or not there is a connected communicating unit for which a desktop has not been set. In the case where there is a connected communicating unit for which a desktop has not been set (S108: YES), the process is advanced to S109. In the case where there is no connected communicating unit for which a desktop has not been set (S108: NO), the process is returned to S101. In this case, a connected communicating unit for which a desktop has not been set is a connected communicating unit for which correspondence information has not been acquired.

In S109, the desktop setting unit 115 sets an extended desktop (second output mode) with respect to a connected communicating unit for which a determination has been made in S108 that a desktop has not been set. Subsequently, the process is returned to S101.

Enabling not only an integrated desktop to be automatically set but also an extended desktop to be automatically set further improves convenience.

The image output unit included in a connected communicating unit for which an extended desktop has been set generates image data of the extended desktop and outputs the generated image data.

It should be noted that various conventional techniques can be used as a setting method of an extended desktop.

As described above, according to the present embodiment, the first output mode is automatically set with respect to a second communicating unit (a communicating unit included in an image output apparatus) for which correspondence information has been acquired. Accordingly, an image output apparatus and an image display apparatus including a plurality of communicating units can now be suitably utilized. Specifically, convenience in the case where an image output apparatus is connected to and used with an image display apparatus having a plurality of communicating units can be improved.

In addition, according to the present embodiment, the second output mode is automatically set with respect to a second communicating unit for which correspondence information has not been acquired. Consequently, convenience in the case where an image output apparatus is connected to and used with an image display apparatus having a plurality of communicating units can be further improved.

Figure 5:
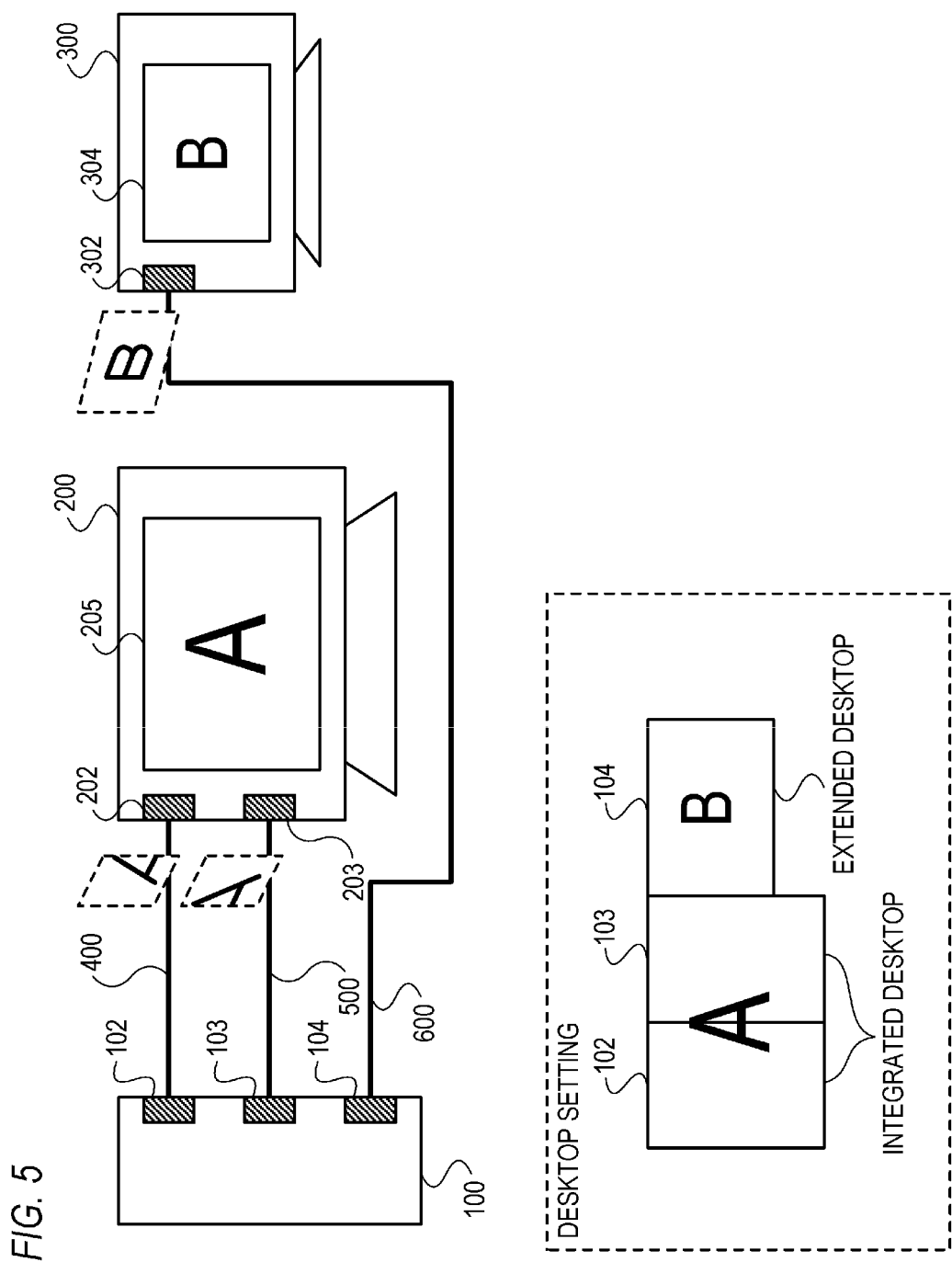
FIG. 5 is a diagram showing an example of operations of an image display system according to the first embodiment.

For example, as shown in FIG. 5, an integrated desktop is automatically set with respect to a second communicating unit that outputs image data to the LCD 200 and an extended desktop is automatically set with respect to a second communicating unit that outputs image data to the LCD 300. As a result, a suitable desktop can be automatically set without the user having to perform troublesome setting operations. Specifically, a desktop can be automatically set so that one desktop image is displayed on one screen that is physically present.

Moreover, while an example in which information acquired by an image output apparatus from an image display apparatus is a Display ID has been described in the present embodiment, the information to be acquired is not limited thereto. For example, the information acquired by an image output apparatus from an image display apparatus may be EDID (Extended Display Identification Data) or the like. In addition, while an example in which correspondence information is a Tiled block has been described in the present embodiment, correspondence information is not limited thereto. Correspondence information need only be information related to a partial display area and information prompting an integrated desktop to be set.

Moreover, while an example in which an image output apparatus includes three second communicating units has been described in the present embodiment, the number of second communicating units may be more than or less than 3. In addition, while an example in which two image display apparatuses are connected to one image output apparatus has been described in the present embodiment, the number of connected image display apparatuses is not limited thereto. The number of image display apparatuses connected to the image output apparatus may be more than or less than two. An image display apparatus whose screen area is made up of a plurality of partial display areas may be connected in plurality to an image output apparatus.

Moreover, while an example in which a screen area is constituted by two partial display areas has been described in the present embodiment, this configuration is not restrictive. The screen area may be configured by more than two partial display areas. In addition, the number of first communicating units included in one image display apparatus may be more than two.

Moreover, with respect to a second communicating unit for which correspondence information has been acquired, an integrated desktop (first output mode) based on area information (layout information and positional information) included in the correspondence information is favorably automatically set. Specifically, the following integrated desktop is favorably automatically set.

an integrated desktop in which an area of an original image corresponding to a partial display area represented by area information in the case where an entire area of a screen corresponds to an entire area of the original image is set as a partial image area Accordingly, more appropriate desktop setting and image display can be performed. Specifically, in an image display apparatus in which a screen area is made up of a plurality of partial display areas, an image with no breakage can be displayed.

Moreover, in the case of displaying one image on a plurality of image display apparatuses, image display can be performed while taking a bezel (frame member) of each image display apparatus into consideration. In the present embodiment, a plurality of second communicating units for which correspondence information has been acquired are used for image display using a single screen. Therefore, in S107, a desktop (output mode) is favorably set so that image display which takes a bezel into consideration is not performed. Since image display that takes a bezel into consideration is conventional art, a description thereof will be omitted.

Moreover, there may be cases where a user desires to display a plurality of desktops (extended desktops) on one screen.

In consideration thereof, in the case where a user operation for releasing the first output mode (setting of integrated desktop) that has been set to a second communicating unit is performed, the desktop setting unit may automatically set the second output mode (extended desktop) to the second communicating unit.

Accordingly, convenience can be further improved.

Moreover, the second output mode can also be described as an output mode in which image data of one virtual screen is output. A virtual screen is a screen that is logically present and is a screen recognized by an image output apparatus for each second communicating unit.

In addition, in the case of setting the second output mode with respect to each of two or more second communicating units for which correspondence information has been acquired, the second output mode is favorably set based on positional information included in the correspondence information. Specifically, the second output mode is favorably set with respect to each of the two or more second communicating units so that the following condition is satisfied.

An arrangement of two or more virtual screens that are assumed in two or more second output modes that are set with respect to the two or more second communicating units is consistent with an arrangement of two or more partial display areas related to two or more correspondence information acquired with respect to the two or more second communicating units.

<Second Embodiment>

Hereinafter, an image display system and a control method thereof according to a second embodiment of the present invention will be described. Moreover, a description of functions and configurations that are similar to those of the first embodiment will be omitted.

(Configuration of Image Display System)

A configuration of an image display system according to the present embodiment will be concisely described.

Figure 6:
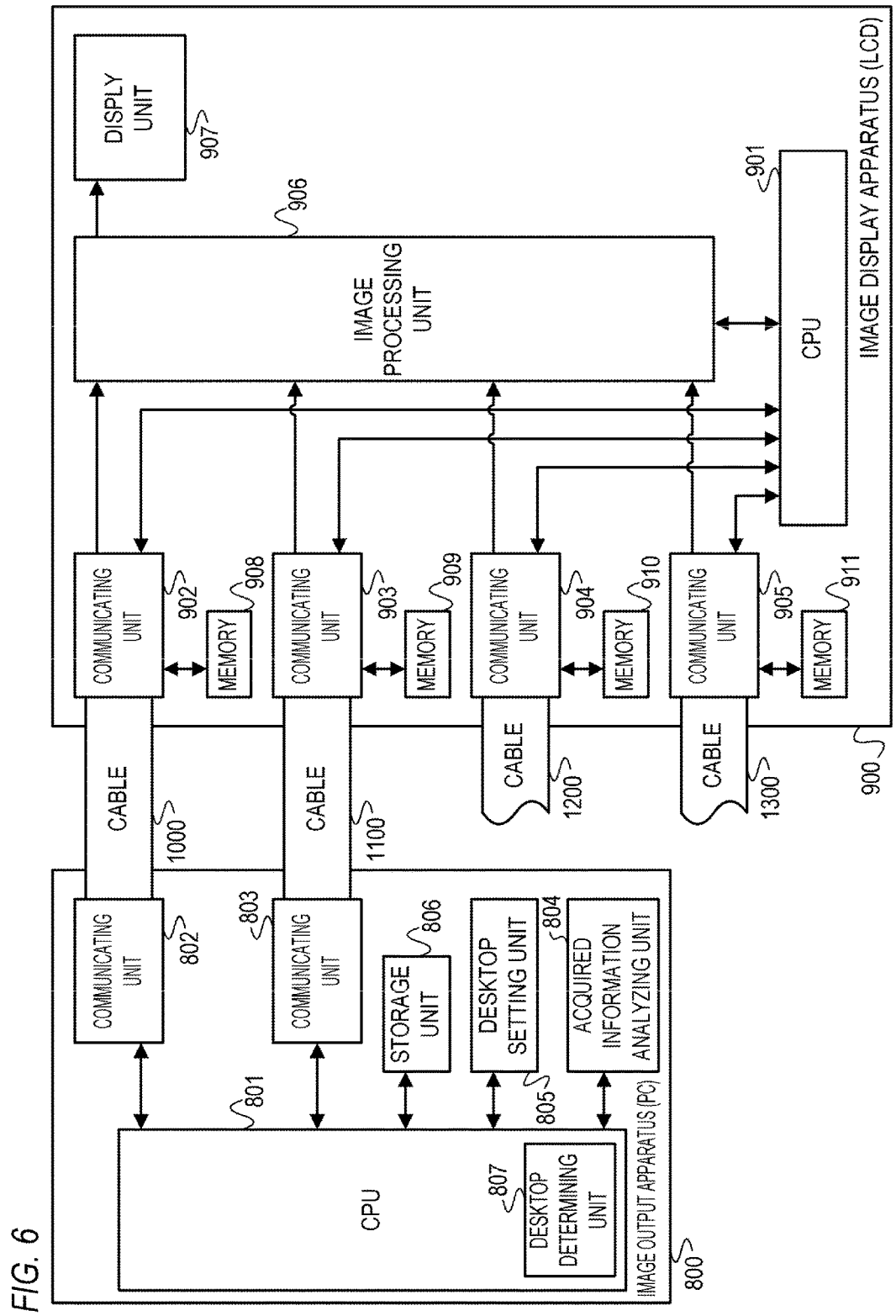
FIG. 6 is a block diagram showing an example of a configuration of an image display system according to a second embodiment.

FIG. 6 is a block diagram showing an example of a configuration of an image display system according to the present embodiment.

As shown in FIG. 6, the image display system according to the present embodiment includes an image output apparatus 800 and an image display apparatus 900.

In the present embodiment, an example of a case where a PC is used as the image output apparatus 800 will be described. Hereinafter, the image output apparatus 800 will be described as a "PC 800".

In addition, in the present embodiment, an example of a case where an LCD is used as the image display apparatus 900 will be described. Hereinafter, the image display apparatus 900 will be described as an "LCD 900".

In FIG. 6, the LCD 900 is connected to the PC 800. Specifically, the PC 800 is connected to the LCD 900 using cables 1000 and 1100. In addition, in FIG. 6, cables 1200 and 1300 are also connected to the LCD 900. However, the LCD 900 is connected to one of the ends of the cables 1200 and 1300, and no apparatuses are connected to the other ends of the cables 1200 and 1300. In the present embodiment, an example of a case where a cable in compliance with the DP standard is used as the cables 1000, 1100, 1200, and 1300 will be described. Hereinafter, the cable 1000 will be described as a "DP 1000", the cable 1100 will be described as a "DP 1100", the cable 1200 will be described as a "DP 1200", and the cable 1300 will be described as a "DP 1300".

(Configuration of PC 800)

A configuration of the PC 800 will now be described.

As shown in FIG. 6, the PC 800 includes a CPU 801, communicating units 802 and 803, an acquired information analyzing unit 804, a desktop setting unit 805, a storage unit 806, and the like.

The CPU 801 controls operations of the respective functional units included in the PC 800 by deploying and executing an OS program stored in the storage unit 806. In addition, the CPU 801 includes a desktop determining unit 807. Specifically, a function of the desktop determining unit 807 is realized as the CPU 801 deploys and executes a determination program stored in the storage unit 806.

The communicating units 802 and 803 are communicating units (second communicating units) that can be used to transmit and receive data to and from an external apparatus.

In FIG. 6, the communicating unit 802 is connected to a communicating unit 902 of the LCD 900 using the DP 1000. Therefore, the communicating unit 802 is capable of transmitting and receiving data to and from the communicating unit 902 via the DP 1000.

Furthermore, in FIG. 6, the communicating unit 803 is connected to a communicating unit 903 of the LCD 900 using the DP 1100. Therefore, the communicating unit 803 is capable of transmitting and receiving data to and from the communicating unit 903 via the DP 1100.

The communicating units 802 and 803 include an image output unit, an information acquiring unit, a connection detecting unit, and the like in a similar manner to the communicating units 102, 103, and 104 according to the first embodiment.

The acquired information analyzing unit 804 analyzes information (Display ID) acquired by the information acquiring units of the communicating units 802 and 803.

The desktop setting unit 805 performs desktop setting in accordance with an instruction from the desktop determining unit 807.

The storage unit 806 includes a nonvolatile memory and a volatile memory. The volatile memory is used as a work memory in the case where, for example, the CPU 801 performs a process. Various programs to be executed on the PC 800 are stored in the nonvolatile memory. The programs recorded in the storage unit 806 may be either rewritable or non-rewritable.

The desktop determining unit 807 issues instructions to the desktop setting unit 805 based on a result of an analysis by the acquired information analyzing unit 804.

(Configuration of LCD 900)

A configuration of the LCD 900 will now be described.

As shown in FIG. 6, the LCD 900 includes a CPU 901, communicating units 902, 903, 904, and 905, an image processing unit 906, a display unit 907, and memories 908, 909, 910, and 911.

The CPU 901 controls operations of the respective functional units included in the LCD 900 by deploying and executing a control program stored in a storage unit (not shown).

The communicating units 902, 903, 904, and 905 are communicating units (first communicating units) that can be used to transmit and receive data to and from an external apparatus. Since functions of the communicating units 902, 903, 904, and 905 are similar to those of the communicating units 202 and 203 according to the first embodiment, a detailed description thereof will be omitted.

In FIG. 6, the communicating unit 902 is capable of transmitting and receiving data to and from the communicating unit 802 of the PC 800 via the DP 1000. A Display ID corresponding to the communicating unit 902 is stored in the memory 908, and the communicating unit 902 can read the Display ID corresponding to the communicating unit 902 from the memory 908 and output the Display ID.

The communicating unit 903 is capable of transmitting and receiving data to and from the communicating unit 803 of the PC 800 via the DP 1100. A Display ID corresponding to the communicating unit 903 is stored in the memory 909, and the communicating unit 903 can read the Display ID corresponding to the communicating unit 903 from the memory 909 and output the Display ID.

Since external apparatuses are not connected to the communicating units 904 and 905, the communicating units 904 and 905 do not transmit and receive data to and from external apparatuses. A Display ID corresponding to the communicating unit 904 is stored in the memory 910, and the communicating unit 904 can read the Display ID corresponding to the communicating unit 904 from the memory 910 and output the Display ID. A Display ID corresponding to the communicating unit 905 is stored in the memory 911, and the communicating unit 905 can read the Display ID corresponding to the communicating unit 905 from the memory 911 and output the Display ID.

The image processing unit 906 performs prescribed image processing on image data output from the communicating units 902, 903, 904, and 905 and outputs the processed image data. As described in the first embodiment, prescribed image processing is, for example, a format conversion process for converting a format of the image data into a format that can be displayed on the display unit 907.

In addition, the image processing unit 906 controls an emission state of a light source (backlight) of the display unit 907.

As shown in FIG. 7, a screen area of the LCD 900 is made up of four partial display areas 1 to 4 that are arranged in a two-row, two-column matrix pattern. An image based on image data output from the communicating unit 902 is displayed in a first row, first column partial display area 1 and an image based on image data output from the communicating unit 903 is displayed in a first row, second column partial display area 2. In addition, an image based on image data output from the communicating unit 904 is displayed in a second row, first column partial display area 3 and an image based on image data output from the communicating unit 905 is displayed in a second row, second column partial display area 4. In other words, the partial display area 1 is associated with the communicating unit 902, the partial display area 2 is associated with the communicating unit 903, the partial display area 3 is associated with the communicating unit 904, and the partial display area 4 is associated with the communicating unit 905. Therefore, a Display ID that is correspondence information related to the partial display area 1 is output from the communicating unit 902 and a Display ID that is correspondence information related to the partial display area 2 is output from the communicating unit 903. A Display ID that is correspondence information related to the partial display area 3 is output from the communicating unit 904 and a Display ID that is correspondence information related to the partial display area 4 is output from the communicating unit 905. Furthermore, formats of the image data output from the communicating units 902, 903, 904, and 905 are converted by the image processing unit 906. The format of the image data output from the communicating unit 902 is converted into a format that can be displayed in the partial display area 1, and the format of the image data output from the communicating unit 903 is converted into a format that can be displayed in the partial display area 2. The format of the image data output from the communicating unit 904 is converted into a format that can be displayed in the partial display area 3, and the format of the image data output from the communicating unit 905 is converted into a format that can be displayed in the partial display area 4.

The display unit 907 includes a liquid crystal display panel and a backlight. The display unit 907 displays an image based on image data output from the image processing unit 906.

The memory 908 is a nonvolatile memory storing a Display ID corresponding to the communicating unit 902, and the memory 909 is a nonvolatile memory storing a Display ID corresponding to the communicating unit 903. The memory 910 is a nonvolatile memory storing a Display ID corresponding to the communicating unit 904, and the memory 911 is a nonvolatile memory storing a Display ID corresponding to the communicating unit 905.

(Configuration of DP)

The DPs 1000, 1100, 1200, and 1300 have a similar configuration to the DPs 400, 500, and 600 according to the first embodiment. Specifically, the DPs 1000, 1100, 1200, and 1300 include signal lines such as a Lane, an AUXCH, and an HPD line.

(Tiled Block)

In the present embodiment, an example in which a Tiled block is used as correspondence information in a similar manner to the first embodiment will be described.

Moreover, since a data structure of a Display ID according to the present embodiment is similar to that of the Display ID according to the first embodiment, a description thereof will be omitted. In addition, since a data structure of a Tiled block according to the present embodiment is similar to that of the Tiled block according to the first embodiment, a description thereof will be omitted.

In the present embodiment, the LCD 900 is one image display apparatus and a screen area of the LCD 900 is constituted by a plurality of partial display areas. Therefore, "True" is used as physical monitor configuration information corresponding to the communicating units 902, 903, 904, and 905.

In addition, in the present embodiment, a screen area of the LCD 900 is constituted by four partial display areas arranged in a two-row, two-column matrix pattern. Therefore, as layout information corresponding to the communicating units 902, 903, 904, and 905, layout information is used in which the number of partial display areas in the horizontal direction is 2 and the number of partial display areas in the vertical direction is 2. Furthermore, in the present embodiment, the partial display area corresponding to the communicating unit 902 is a leftmost and topmost partial display area. Therefore, (position in horizontal direction, position in vertical direction)=(1, 1) is used as positional information corresponding to the communicating unit 902. The partial display area corresponding to the communicating unit 903 is a second from left and topmost partial display area. Therefore, (2, 1) is used as positional information corresponding to the communicating unit 903. The partial display area corresponding to the communicating unit 904 is a leftmost and second from top partial display area. Therefore, (1, 2) is used as positional information corresponding to the communicating unit 904. The partial display area corresponding to the communicating unit 905 is a second from left and second from top partial display area. Therefore, (2, 2) is used as positional information corresponding to the communicating unit 905.

(Desktop Configuration Process)

A problem that occurs in the case where a part of the first communicating units is used for a connection between the PC 800 and the LCD 900 will be described with reference to FIG. 8.

In the example shown in FIG. 8, only the communicating units 902 and 903 of the LCD 900 are used for the connection between the PC 800 and the LCD 900, and external apparatuses are not connected to the communicating units 904 and 905 of the LCD 900.

Let us assume that, with respect to the communicating units 802 and 803 for which connections with the LCD 900 have already been established, the PC 800 sets an integrated desktop based on layout information (layout information corresponding to the communicating units 902 and 903) acquired by the communicating units 802 and 803. The layout information corresponding to the communicating units 902 and 903 is layout information in which the number of partial display areas in the horizontal direction is 2 and the number of partial display areas in the vertical direction is 2. Therefore, with respect to the communicating units 802 and 803, an integrated desktop is set which assumes that a screen area is constituted by four partial display areas in a two-row, two-column arrangement.

In this case, the communicating units 902 and 903 acquire image data of the set integrated desktop (image data of part of the integrated desktop) from the PC 800 and output the acquired image data to the image processing unit 906. Since image data is not input to the communicating units 904 and 905, image data is not output from the communicating units 904 and 905 to the image processing unit 906.

As a result, as shown in FIG. 8, an image with a chipped lower half (chipping of image) ends up being displayed on the screen of the LCD 900.

Generally, on an image of a desktop, an operating unit is often arranged at a specific position such as a bottom part of the image. For example, an operating unit such as a start button for performing a power supply operation of the PC 800 or the like or a task bar indicating a state of an application executed by the PC 800 or the like is often arranged in a bottom part of the image.

Therefore, in the case where a part of the image is chipped as shown in FIG. 8, various user operations can no longer be performed and various types of information can no longer be visually confirmed (decline in convenience).

As described above, in the case where a part of the first communicating units is used for the connection between the PC 800 and the LCD 900, chipping of an image or a decline in convenience may occur.

In consideration thereof, in the present embodiment, a desktop configuration process capable of solving the problem described above is performed.

Specifically, in the case where correspondence information with respect to all partial display areas is acquired, the desktop setting unit 805 performs an automatic integration setting process that automatically sets an integrated desktop (the first output mode) with respect to a second communicating unit for which correspondence information has been acquired. In addition, in the case where correspondence information with respect to at least a part of the partial display areas has not been acquired, the desktop setting unit 805 omits the automatic integration setting process. Accordingly, an occurrence of chipping of an image or a decline in convenience described earlier can be suppressed.

A desktop configuration process performed by the PC 800 will now be described with reference to FIG. 9.

Figure 9:
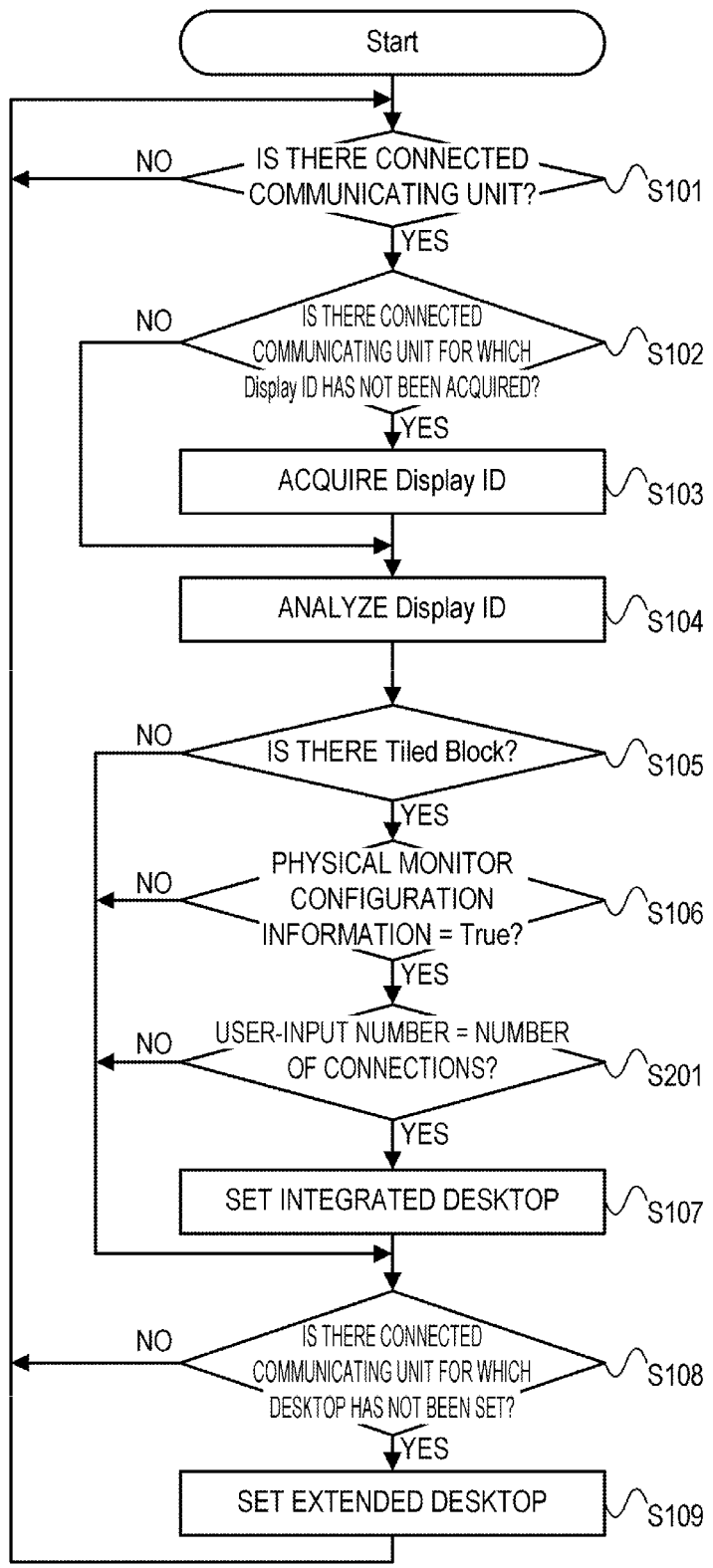
FIG. 9 is a flow chart showing an example of a desktop configuration process according to the second embodiment.

FIG. 9 is a flow chart for describing an example of the desktop configuration process according to the present embodiment.

Moreover, in FIG. 9, same processes as in the first embodiment (FIG. 4) are assigned same reference characters as the first embodiment and descriptions thereof are omitted.

It should be understood that the processing flow presented below is simply an example and a processing flow of the desktop configuration process according to the present embodiment is not limited to the following processing flow.

In the case where there is a connected communicating unit for which acquired physical monitor configuration information is "True" (S106: YES), a determination must be made on whether or not correspondence information for all partial display areas has been acquired. In other words, a determination must be made on whether or not all of the communicating units of the LCD 900 are being used for the connection between the PC 800 and the LCD 900.

To this end, in the present embodiment, in the case where there is a connected communicating unit for which acquired physical monitor configuration information is "True" (S106: YES), the process is advanced from S106 to S201.

In S201, the CPU 101 determines whether or not a total number of the acquired correspondence information is consistent with a total number of partial display areas. The total number of the acquired correspondence information can be obtained based on a result of the determination made in S105. The total number of the partial display areas can be obtained based on a result of the analysis performed in S104. Specifically, the total number of the partial display areas can be acquired from layout information. The layout information corresponding to the communicating units 902, 903, 904, and 905 is layout information in which the number of partial display areas in the horizontal direction is 2 and the number of partial display areas in the vertical direction is 2. Therefore, 4 can be obtained as the total number of the partial display areas from the layout information corresponding to the communicating units 902, 903, 904, and 905.

In the case where the total number of the acquired correspondence information is consistent with the total number of partial display areas (S201: YES), a determination is made that all of the communicating units of the LCD 900 are being used for the connection between the PC 800 and the LCD 900 and the process is advanced to S107. In the case where the total number of the acquired correspondence information is not consistent with the total number of partial display areas (S201: NO), a determination is made that a part of the communicating units of the LCD 900 is not being used for the connection between the PC 800 and the LCD 900 and the process is advanced to S108. Specifically, "in the case where the total number of the acquired correspondence information is not consistent with the total number of partial display areas" means "in the case where the total number of the acquired correspondence information is smaller than the total number of partial display areas".

Moreover, a total number of the connected communicating units detected in S101 may be used as the total number of the acquired correspondence information.

Therefore, in the present embodiment, in the case where the total number of the acquired correspondence information is consistent with the total number of partial display areas, the automatic integration setting process (a process for automatically setting an integrated desktop) described earlier is performed (S107). Meanwhile, in the case where the total number of the acquired correspondence information is not consistent with the total number of partial display areas, the automatic integration setting process described earlier is omitted.

In addition, in the present embodiment, in the case where the automatic integration setting process described earlier is omitted, the process of S109 causes an extended desktop (second output mode) to be automatically set with respect to a connected communicating unit (second communicating unit) for which correspondence information has been acquired.

Moreover, in the case where the automatic integration setting process described earlier is omitted, a desktop (operating mode) need not be automatically set with respect to a connected communicating unit for which correspondence information has been acquired. In the case where the automatic integration setting process described earlier is omitted, a desktop may be manually set (in accordance with a user operation) with respect to a connected communicating unit for which correspondence information has been acquired.

As described above, in the present embodiment, in the case where correspondence information with respect to all partial display areas is acquired, an automatic integration setting process is performed which automatically sets an integrated desktop (the first output mode) with respect to a second communicating unit for which correspondence information has been acquired. In addition, in the case where correspondence information with respect to at least a part of the partial display areas has not been acquired, the automatic integration setting process described above is omitted. Consequently, convenience in the case where an image output apparatus is connected to and used with an image display apparatus having a plurality of communicating units can be further improved. Specifically, in the case where correspondence information has been acquired for all partial display areas, convenience can be improved in a similar manner to the first embodiment. In other cases, an occurrence of chipping of an image or a decline in convenience described with reference to FIG. 8 can be suppressed.

Furthermore, according to the present embodiment, in the case where correspondence information with respect to at least a part of the partial display areas has not been acquired, an extended desktop (second output mode) is automatically set with respect to a second communicating unit for which correspondence information has been acquired. Accordingly, convenience can be further improved.

Figure 10:
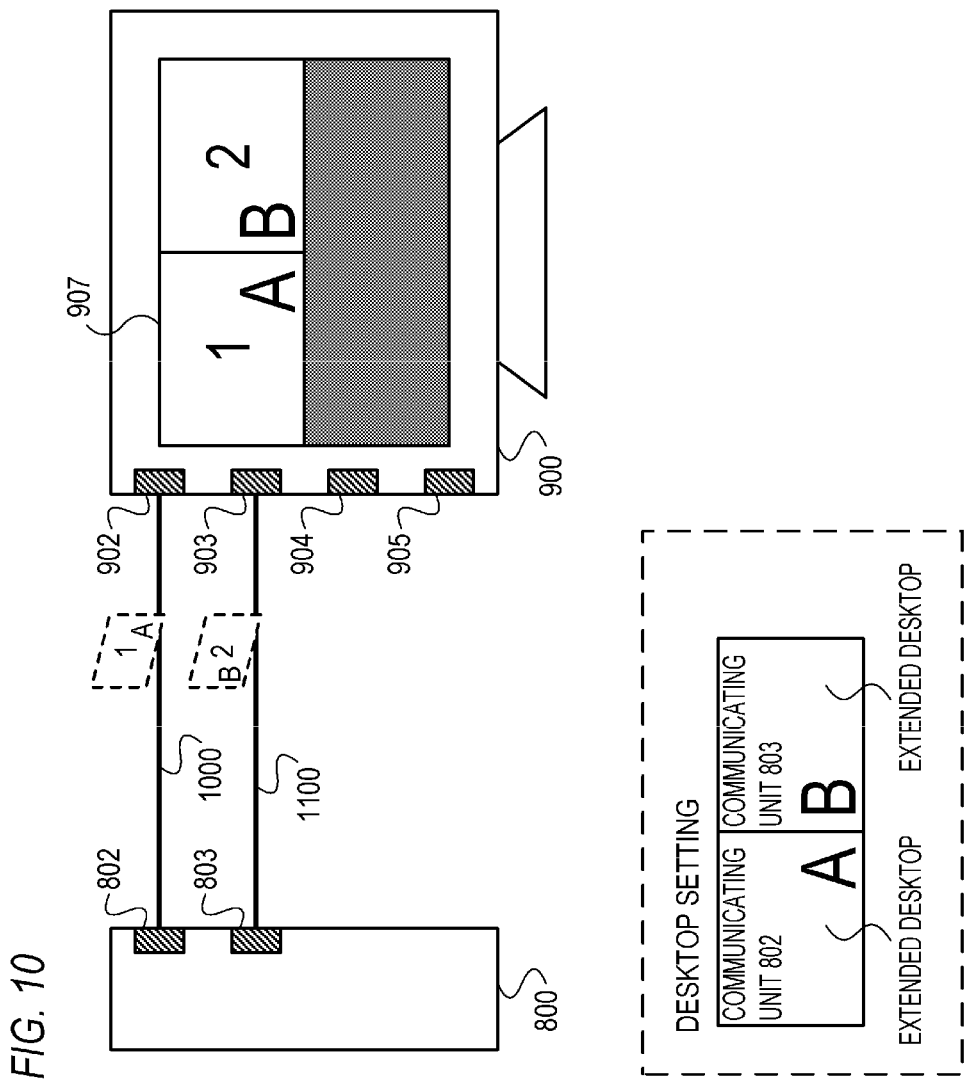
FIG. 10 is a diagram showing an example of operations of an image display system according to the second embodiment.

For example, as shown in FIG. 10, in the case where a part of the communicating units of the LCD 900 is not being used for the connection between the PC 800 and the LCD 900, the automatic integration setting process described above is omitted. In addition, an extended desktop is automatically set with respect to a second communicating unit that is being used for the connection between the PC 800 and the LCD 900. As a result, display of a partially chipped desktop can be suppressed and a decline in convenience due to such chipping of an image can be suppressed.

<Third Embodiment>

Hereinafter, an image display system and a control method thereof according to a third embodiment of the present invention will be described. Moreover, a description of functions and configurations that are similar to those of the first and second embodiments will be omitted.

(Configuration of Image Display System)

A configuration of an image display system according to the present embodiment will be concisely described.

Figure 11:
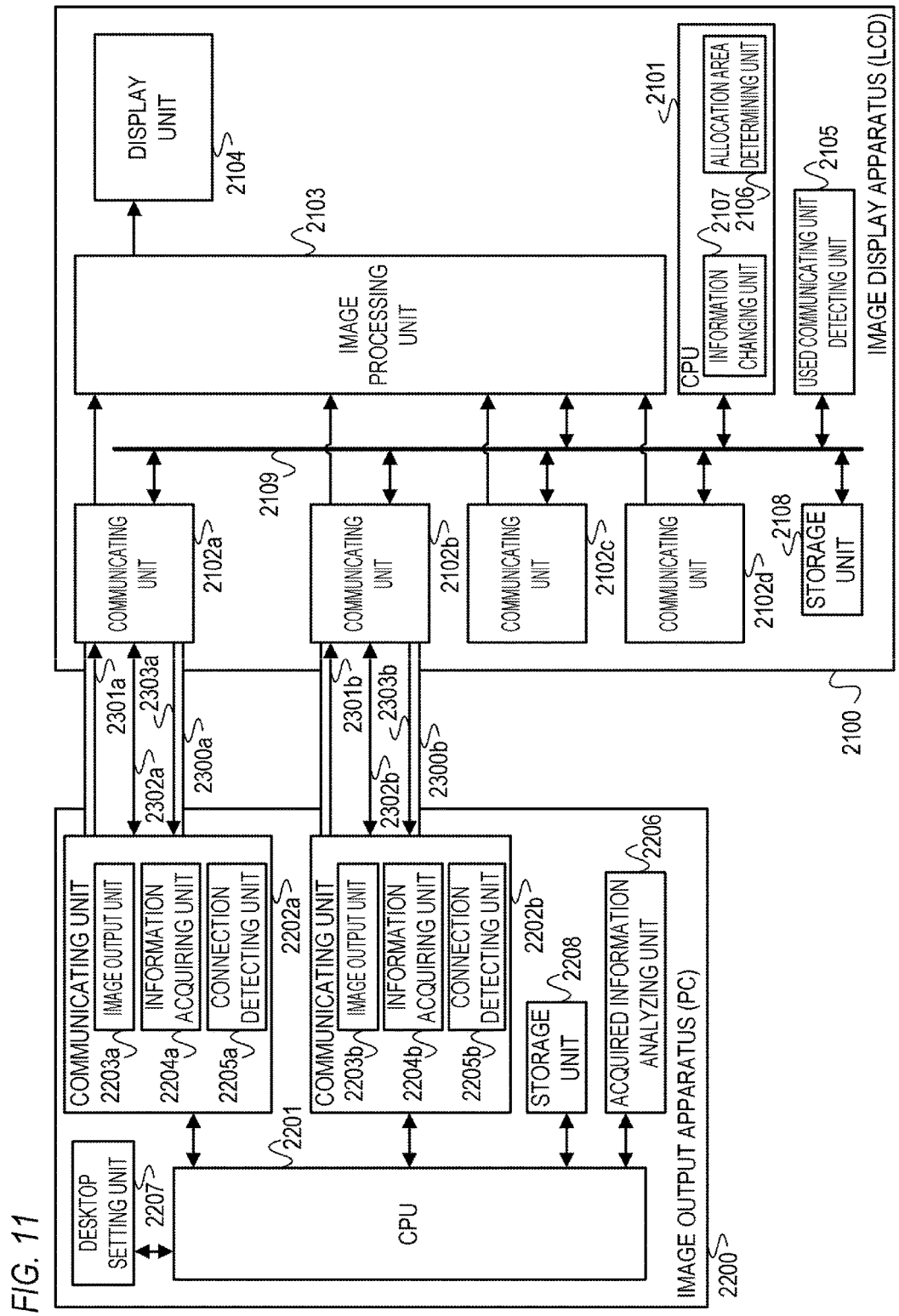
FIG. 11 is a block diagram showing an example of a configuration of an image display system according to a third embodiment.

FIG. 11 is a block diagram showing an example of a configuration of an image display system according to the present embodiment.

As shown in FIG. 11, the image display system according to the present embodiment includes an image output apparatus 2200 and an image display apparatus 2100.

In the present embodiment, an example of a case where a PC is used as the image output apparatus 2200 will be described. Hereinafter, the image output apparatus 2200 will be described as a "PC 2200".

In addition, in the present embodiment, an example of a case where an LCD is used as the image display apparatus 2100 will be described. Hereinafter, the image display apparatus 2100 will be described as an "LCD 2100".

In FIG. 11, the LCD 2100 is connected to the PC 2200. Specifically, the PC 2200 is connected to the LCD 2100 using cables 2300a and 2300b. In the present embodiment, an example of a case where a cable in compliance with the DP standard is used as the cables 2300a and 2300b will be described. Hereinafter, the cable 2300a will be described as a "DP 2300a" and the cable 2300b will be described as a "DP 2300b".

(Configuration of PC 2200)

A configuration of the PC 2200 will now be described.

At the PC 2200, a desktop configuration process similar to that of the first and second embodiments is performed.

As shown in FIG. 11, the PC 2200 includes a CPU 2201, communicating units 2202a and 2202b, an acquired information analyzing unit 2206, a desktop setting unit 2207, a storage unit 2208, and the like.

The CPU 2201 has a similar function to the CPU 101 according to the first embodiment.

The communicating units 2202a and 2202b are second communicating units with similar functions to the communicating units 102, 103, and 104 of the first embodiment.

In FIG. 11, the communicating unit 2202a is connected to a communicating unit 2102a of the LCD 2100 using the DP 2300a. Therefore, the communicating unit 2202a is capable of transmitting and receiving data to and from the communicating unit 2102a via the DP 2300a.

In addition, in FIG. 11, the communicating unit 2202b is connected to a communicating unit 2102b of the LCD 2100 using the DP 2300b. Therefore, the communicating unit 2202b is capable of transmitting and receiving data to and from the communicating unit 2102b via the DP 2300b.

The communicating unit 2202a includes an image output unit 2203a, an information acquiring unit 2204a, a connection detecting unit 2205a, and the like, and the communicating unit 2202b includes an image output unit 2203b, an information acquiring unit 2204b, a connection detecting unit 2205b, and the like.

The image output units 2203a and 2203b have similar functions to the image output units 105, 108, and 111 according to the first embodiment.

The information acquiring units 2204a and 2204b have similar functions to the information acquiring units 106, 109, and 112 according to the first embodiment.

The connection detecting units 2205a and 2205b have similar functions to the connection detecting units 107, 110, and 113 according to the first embodiment.

The acquired information analyzing unit 2206 analyzes information (Display ID) acquired by the information acquiring units 2204a and 2204b of the communicating units 2202a and 2202b.

The desktop setting unit 2207 performs desktop setting in accordance with an instruction from the CPU 2201 (desktop determining unit).

The storage unit 2208 includes a nonvolatile memory and a volatile memory. The volatile memory is used as a work memory in the case where, for example, the CPU 2201 performs a process. Various programs to be executed on the PC 2200 are stored in the nonvolatile memory. The programs recorded in the storage unit 2208 may be either rewritable or non-rewritable.

(Configuration of LCD 2100)

A configuration of the LCD 2100 will now be described.

As shown in FIG. 11, the LCD 2100 includes a CPU 2101, communicating units 2102a, 2102b, 2102c, and 2102d, an image processing unit 2103, a display unit 2104, a used communicating unit detecting unit 2105, a storage unit 2108, an internal bus 2109, and the like.

The CPU 2101 controls operations of the respective functional units included in the LCD 2100 by deploying and executing a control program stored in the storage unit 2108. In addition, as shown in FIG. 11, the CPU 2101 includes an allocation area determining unit 2106 and an information changing unit 2107. Specifically, functions of the allocation area determining unit 2106 and the information changing unit 2107 are realized as a program stored in the storage unit 2108 is executed.

The communicating units 2102a, 2102b, 2102c, and 2102d are first communicating units that can be used to transmit and receive data to and from an external apparatus.

In FIG. 11, the communicating unit 2102a is capable of transmitting and receiving data to and from the communicating unit 2202a of the PC 2200 via the DP 2300a.

The communicating unit 2102b is capable of transmitting and receiving data to and from the communicating unit 2202b of the PC 2200 via the DP 2300b.

Since external apparatuses are not connected to the communicating units 2102c and 2102d, the communicating units 2102c and 2102d do not transmit and receive data to and from external apparatuses.

Figure 12:
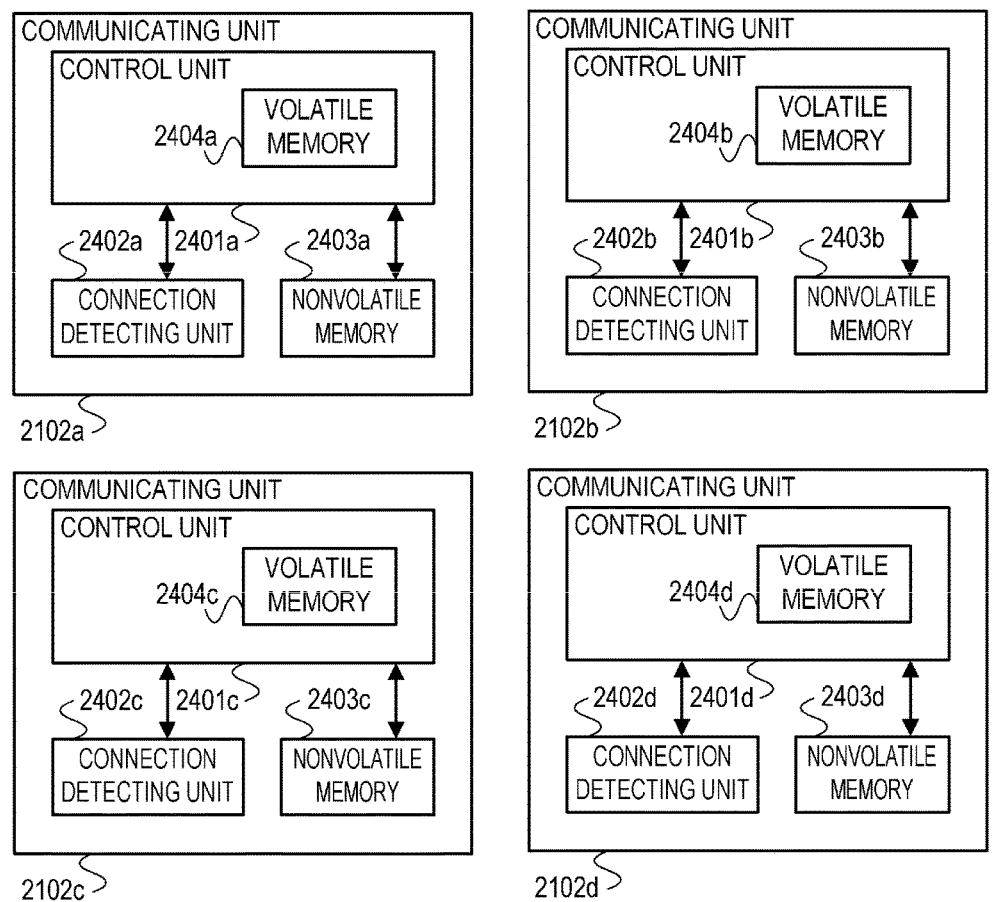
FIG. 12 is a block diagram showing an example of a configuration of a first communicating unit according to the third embodiment.

As shown in FIG. 12, the communicating unit 2102a includes a control unit 2401a, a connection detecting unit 2402a, a nonvolatile memory 2403a, a volatile memory 2404a, and the like. The communicating unit 2102b includes a control unit 2401b, a connection detecting unit 2402b, a nonvolatile memory 2403b, a volatile memory 2404b, and the like. The communicating unit 2102c includes a control unit 2401c, a connection detecting unit 2402c, a nonvolatile memory 2403c, a volatile memory 2404c, and the like. The communicating unit 2102d includes a control unit 2401d, a connection detecting unit 2402d, a nonvolatile memory 2403d, a volatile memory 2404d, and the like.

The control unit 2401a acquires image data output from an external apparatus to the communicating unit 2102a and outputs the acquired image data to the image processing unit 2103. The control units 2401b, 2401c, and 2401d have a similar function to the control unit 2401a. For example, the control unit 2401b acquires image data output from an external apparatus to the communicating unit 2102b and outputs the acquired image data to the image processing unit 2103. In FIG. 11, the control unit 2401a acquires image data from the communicating unit 2202a of the PC 2200 via a Lane 2301a of the DP 2300a. The control unit 2401b acquires image data from the communicating unit 2202b of the PC 2200 via a Lane 2301b of the DP 2300b. Since external apparatuses are not connected to the communicating units 2102c and 2102d, the control units 2401c and 2401d do not acquire image data.

In addition, in the case where power is supplied to the communicating unit 2102a, the control unit 2401a reads a Display ID from the nonvolatile memory 2403a and records the read Display ID in the volatile memory 2404a. Supplying of power to the communicating unit 2102a is started at a timing when, for example, a power supply state of the LCD 2100 is switched to an on state. As described earlier, the control units 2401b, 2401c, and 2401d have a similar function to the control unit 2401a. For example, in the case where power is supplied to the communicating unit 2102b, the control unit 2401b reads a Display ID from the nonvolatile memory 2403b and records the read Display ID in the volatile memory 2404b.

Furthermore, in the case of an instruction that requests a Display ID is output from an external apparatus to the communicating unit 2102a, the control unit 2401a outputs the Display ID stored in the volatile memory 2404a to the external apparatus. As described earlier, the control units 2401b, 2401c, and 2401d have a similar function to the control unit 2401a. For example, in the case of an instruction that requests a Display ID is output from an external apparatus to the communicating unit 2102b, the control unit 2401*b* outputs the Display ID stored in the volatile memory 2404*b* to the external apparatus. In FIG. 11, an instruction that requests a Display ID may be output from the communicating unit 2202*a* of the PC 2200 to the communicating unit 2102*a* via the DP 2300*a*. In the case where the instruction described above is output from the communicating unit 2202*a*, the control unit 2401*a* outputs the Display ID stored in the volatile memory 2404*a* to the communicating unit 2202*a* via the AUXCH 2302*a* of the DP 2300*a*. In FIG. 11, an instruction that requests a Display ID may be output from the communicating unit 2202*b* of the PC 2200 to the communicating unit 2102*b* via the DP 2300*b*. In the case where the instruction described above is output from the communicating unit 2202*b*, the control unit 2401*b* outputs the Display ID stored in the volatile memory 2404*b* to the communicating unit 2202*b* via the AUXCH 2302*b* of the DP 2300*b*. Since external apparatuses are not connected to the communicating units 2102*c* and 2102*d*, instructions that request a Display ID are not output from external apparatuses to the communicating units 2102*c* and 2102*d*.

In addition, in the case where a power supply state of the LCD 2100 is an on state, the control unit 2401*a* outputs an H level HPD signal. In addition, in the case where the power supply state of the LCD 2100 is an off state, the control unit 2401*a* outputs an L level HPD signal. As described earlier, the control units 2401*b*, 2401*c*, and 2401*d* have a similar function to the control unit 2401*a*. For example, in the case where the power supply state of the LCD 2100 is an on state, the control unit 2401*b* outputs an H level HPD signal. In addition, in the case where the power supply state of the LCD 2100 is an off state, the control unit 2401*b* outputs an L level HPD signal. In FIG. 11, an HPD signal output from the control unit 2401*a* is input to the communicating unit 2202*a* of the PC 2200 via the HPD line 2303*a* of the DP 2300*a*. An HPD signal output from the control unit 2401*b* is input to the communicating unit 2202*b* of the PC 2200 via the HPD line 2303*b* of the DP 2300*b*. Since external apparatuses are not connected to the communicating units 2102*c* and 2102*d*, HPD signals output from the control units 2401*c* and 2401*d* are not input to external apparatuses.

The connection detecting unit 2402*a* detects a connection of the external apparatus to the communicating unit 2102*a*. The connection detecting units 2402*b*, 2402*c*, and 2402*d* have a similar function to the connection detecting unit 2402*a*. For example, the connection detecting unit 2402*b* detects a connection of the external apparatus to the communicating unit 2102*b*. In FIG. 11, the connection detecting unit 2402*a* detects that the communicating unit 2102*a* has been connected to the communicating unit 2202*a* of the PC 2200 using the DP 2300*a*. In addition, the connection detecting unit 2402*b* detects that the communicating unit 2102*b* has been connected to the communicating unit 2202*b* of the PC 2200 using the DP 2300*b*. For example, the connection detecting unit 2402*a* determines a presence or absence of a connection by monitoring a voltage level of the AUXCH 2302*a* of the DP 2300*a*, and the connection detecting unit 2402*b* determines a presence or absence of a connection by monitoring a voltage level of the AUXCH 2302*b* of the DP 2300*b*. Since external apparatuses are not connected to the communicating units 2102*c* and 2102*d*, connections of external apparatuses are not detected by the connection detecting units 2402*c* and 2402*d*.

The nonvolatile memory 2403*a* stores a Display ID corresponding to the communicating unit 2102*a*. The nonvolatile memories 2403*b*, 2403*c*, and 2403*d* have a similar function to the nonvolatile memory 2403*a*. For example, the nonvolatile memory 2403*b* stores a Display ID corresponding to the communicating unit 2102*b*. As the nonvolatile memories 2403*a*, 2403*b*, 2403*c*, and 2403*d*, for example, EEPROMs can be used. For example, Display IDs determined upon shipment of the LCD 2100 from a factory, prior to shipment of the LCD 2100 from a factory, or the like are recorded in advance in the nonvolatile memories 2403*a*, 2403*b*, 2403*c*, and 2403*d*.

A Display ID read by the control unit 2401*a* from the nonvolatile memory 2403*a* is temporarily stored in the volatile memory 2404*a*. Subsequently, the Display ID recorded in the volatile memory 2404*a* is erased in the case where supply of power to the communicating unit 2102*a* is stopped. For example, the Display ID recorded in the volatile memory 2404*a* is erased in the case where the power supply state of the LCD 2100 is switched to an off state. The volatile memories 2404*b*, 2404*c*, and 2404*d* have a similar function to the volatile memory 2404*a*. For example, a Display ID read by the control unit 2401*b* from the nonvolatile memory 2403*b* is temporarily stored in the volatile memory 2404*b*. Subsequently, the Display ID recorded in the volatile memory 2404*b* is erased in the case where supply of power to the communicating unit 2102*b* is stopped. The Display IDs temporarily recorded in the volatile memories 2404*a*, 2404*b*, 2404*c*, and 2404*d* are rewritable.

The image processing unit 2103 has a similar function to the image processing unit 204 according to the first embodiment and performs prescribed image processing on image data output from the communicating units 2102*a*, 2102*b*, 2102*c*, and 2102*d* and outputs the processed image data. For example, let us assume that a plurality of image data corresponding to a plurality of allocation areas determined by the allocation area determining unit 2106 are input to the image processing unit 2103. In this case, by compositing the plurality of image data based on the plurality of allocation areas, the image processing unit 2103 generates image data representing a combined image that combines images based on the plurality of image data. Subsequently, the image processing unit 2103 outputs the generated image data.

In addition, the image processing unit 2103 controls an emission state of a light source (backlight) of the display unit 2104.

The display unit 2104 includes a liquid crystal display panel and a backlight. The display unit 2104 displays an image based on image data output from the image processing unit 2103.

The used communicating unit detecting unit 2105 detects a first communicating unit used to transmit and receive data to and from an external apparatus. In the present embodiment, a first communicating unit used to transmit and receive data to and from an external apparatus will be described as a "used communicating unit". The used communicating unit detecting unit 2105 outputs information representing used communicating units and the number of used communicating units. In the present embodiment, the number of used communicating units will be described as "the number of used inputs". Used communicating units can be detected based on results of detection by the connection detecting units 2402*a*, 2402*b*, 2402*c*, and 2402*d*.

Moreover, while a first communicating unit connected to an external apparatus is detected as a used communicating unit in the present embodiment, a used communicating unit is not limited thereto. For example, a first communicating unit used to transmit and receive data to and from the PC 2200 may be detected as a used communicating unit. Specifically, a first communicating unit may acquire identification information (identifier) that identifies an external apparatus connected to the first communicating unit from the external apparatus. Subsequently, based on the acquired identification information, the first communicating unit connected to the PC 2200 may be detected as a used communicating unit.

With respect to the used communicating unit detected by the used communicating unit detecting unit 2105, the allocation area determining unit 2106 determines a part of or all of a screen area (displayable area) of the LCD 2100 as an allocation area. Specifically, the allocation area determining unit 2106 determines a same number of allocation areas as the number of used inputs output from the used communicating unit detecting unit 2105. In the case where the number of used inputs is 1, an area equivalent to the screen area is determined as an allocation area. In the case where the number of used inputs is 2 or more, a plurality of allocation areas (partial display areas) constituting the screen area are determined. Subsequently, the allocation area determining unit 2106 allocates (associates) an allocation area to the used communicating unit detected by the used communicating unit detecting unit 2105. In the case where the number of used inputs is 1, an allocation area equivalent to the screen area is allocated to one used communicating unit. In the case where the number of used inputs is 2 or more, a plurality of allocation areas are respectively allocated to a plurality of used communicating units.

With respect to the used communicating unit detected by the used communicating unit detecting unit 2105, the information changing unit 2107 generates allocation information that is information related to an allocation area determined with respect to the used communicating unit. In the present embodiment, a Display ID including allocation information is generated. A Display ID can also be referred to as allocation information. Subsequently, the information changing unit 2107 rewrites a Display ID stored by the volatile memory of the used communicating unit with the generated Display ID. In the case where a plurality of used communicating units are detected, the process described above is performed with respect to each of the plurality of used communicating units.

Various programs to be executed by the LCD 2100 are stored in the storage unit 2108. In addition, processing parameters used by the respective functional units of the LCD 2100 are recorded in the storage unit 2108. For example, image processing parameters used by the image processing unit 2103 are recorded in the storage unit 2108. The programs and processing parameters recorded in the storage unit 2108 may be either rewritable or non-rewritable. The internal bus 2109 is a bus used to transmit data among the functional units of the LCD 2100.

(Configuration of DP)

The DPs 2300a and 2300b have a similar configuration to the DPs 400, 500, and 600 according to the first embodiment. Specifically, the DP 2300a includes signal lines such as the Lane 2301a, the AUXCH 2302a, and the HPD line 2303a, and the DP 2300b includes signal lines such as the Lane 2301b, the AUXCH 2302b, and the HPD line 2303b.

(Display ID)

A Display ID according to the present embodiment will be described with reference to FIG. 13.

A Display ID according to the present embodiment has a similar data structure to that of Display IDs according to the first and second embodiments.

Figure 13:
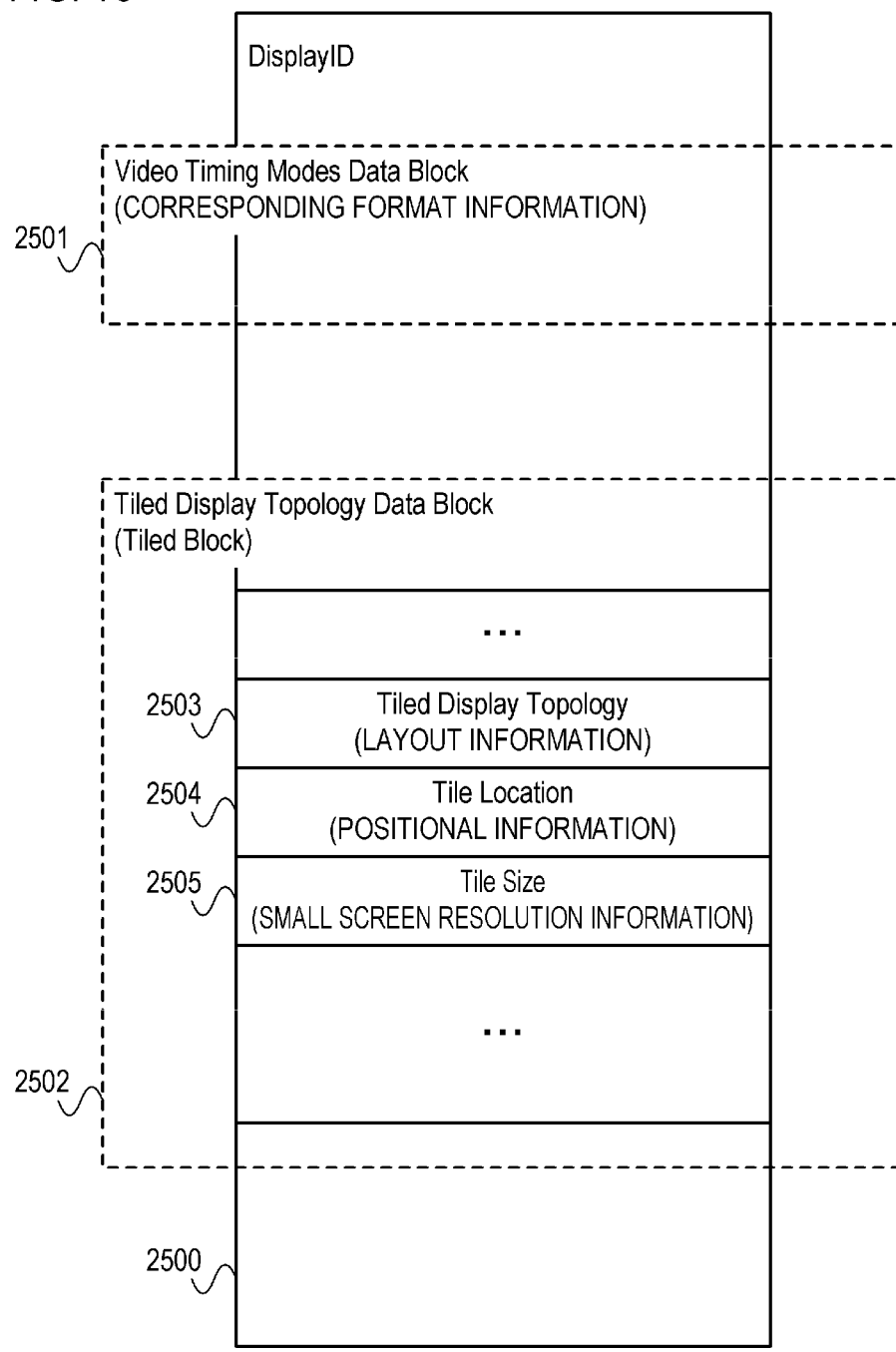
FIG. 13 is a diagram showing an example of a Display ID according to the third embodiment.

As shown in FIG. 13, a Display ID according to the present embodiment includes a Video Timing Modes Data Block. A Video Timing Modes Data Block is format information such as basic display parameters of an image display apparatus and a resolution (maximum value) of image data that can be input to the image display apparatus. Hereinafter, a Video Timing Modes Data Block will be described as "corresponding format information". In addition, a Display ID of an image display apparatus whose screen area is made up of a plurality of partial display areas includes a Tiled block.

A Display ID 2500 shown in FIG. 13 includes corresponding format information 2501 and a Tiled block 2502.

In the present embodiment, in the case where the number of used inputs is 1, a Tiled block is not described in a Display ID and corresponding format information is used as allocation information. In the case where the number of used inputs is 2 or more, a Tiled block is described in a Display ID and the Tiled block is used as allocation information.

Alternatively, in the case where the number of used inputs is 1, a Tiled block indicating that an allocation area is consistent with a screen area may be described as allocation information in a Display ID.

(Tiled Block)

The Tiled block 2502 will now be described with reference to FIG. 13.

As shown in FIG. 13, the Tiled block 2502 is a part of the Display ID 2500. As shown in FIG. 13, the Tiled block 2502 includes a Tiled Display Topology 2503, a Tile Location 2504, and a Tile Size 2505.

Moreover, in the present embodiment, only a part of information (data) will be described and a description of other information included in a display ID or a Tiled block will be omitted.

The Tiled Display Topology 2503 is the layout information described in the first embodiment and is information representing the number of allocation areas in a horizontal direction and the number of allocation areas in a vertical direction. The layout information 2503 is also number information representing a total number of allocation areas.

The Tile Location 2504 is the positional information described in the first embodiment and is information representing a relative position of an allocation area with respect to a screen area.

The Tile Size 2505 is resolution information representing a resolution of an allocation area.

An allocation area is represented by layout information and positional information described earlier. Therefore, the layout information and the positional information can also be collectively referred to as "area information representing an allocation area".

Moreover, a Tiled block may include area information as information that differs from layout information and positional information.

A specific example of a Tiled block will now be described with reference to FIG. 14.

Figure 14:
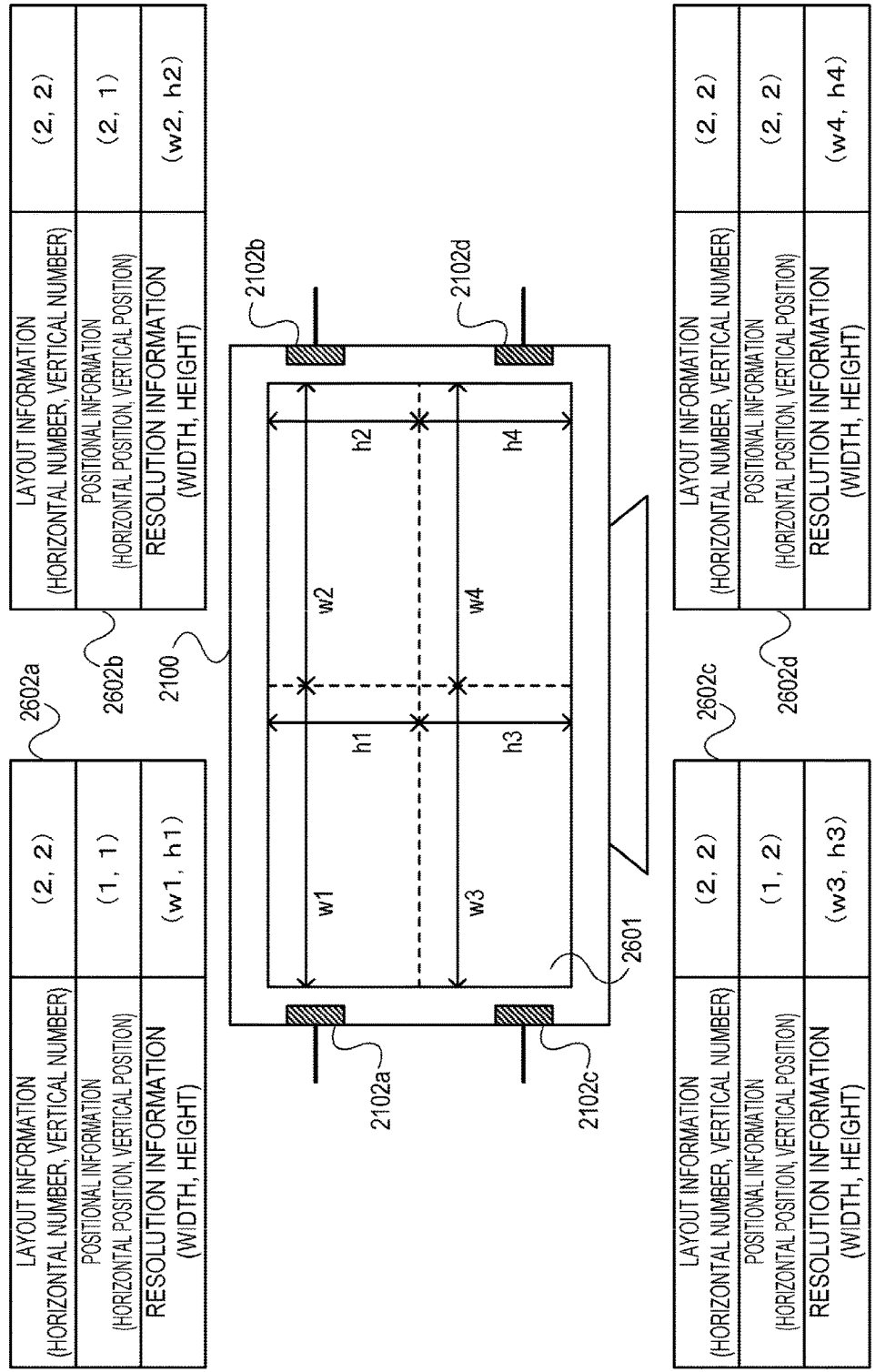
FIG. 14 is a diagram showing an example of a Tiled block according to the third embodiment.

FIG. 14 is a diagram showing an example of a Tiled block of each communicating unit of the LCD 2100.

The Tiled blocks shown in FIG. 14 are Tiled blocks recorded in advance in, for example, the nonvolatile memories 2403a, 2403b, 2403c, and 2403d. For example, Tiled blocks determined upon shipment of the LCD 2100 from a factory, prior to shipment of the LCD 2100 from a factory, or the like are recorded in advance in the nonvolatile memories 2403a, 2403b, 2403c, and 2403d.

The Tiled blocks shown in FIG. 14 are Tiled blocks in the case where four image data are assumed to be input to four communicating units 2102a, 2102b, 2102c, and 2102d. In addition, the Tiled blocks shown in FIG. 14 are also Tiled blocks in the case where four image data necessary for displaying one desktop (integrated desktop) on the screen of the LCD 2100 are acquired as the four image data described above.

In FIG. 14, each of four areas obtained by dividing a screen area 2601 at dashed lines is an allocation area (partial display area).

In the case of displaying one integrated desktop on the screen of the LCD 2100 using four image data, four allocation areas (partial display areas) constituting the screen area 2601 are set as shown in FIG. 14.

In FIG. 14, a Tiled block 2602*a* is allocation information related to a first row, first column allocation area and is a Tiled block of the communicating unit 2102*a*. A Tiled block 2602*b* is allocation information related to a first row, second column allocation area and is a Tiled block of the communicating unit 2102*b*. A Tiled block 2602*c* is allocation information related to a second row, first column allocation area and is a Tiled block of the communicating unit 2102*c*. A Tiled block 2602*d* is allocation information related to a second row, second column allocation area and is a Tiled block of the communicating unit 2102*d*.

The Tiled block 2602*a* will now be described.

Moreover, since the Tiled blocks 2602*b*, 2602*c*, and 2602*d* can be determined by a similar method (criterion) to the Tiled block 2602*a*, a description thereof will be omitted. Layout information is information representing the number of allocation areas in a horizontal direction and the number of allocation areas in a vertical direction. In FIG. 14, the screen area 2601 is constituted by four allocation areas arranged in a two-row, two-column matrix pattern. Therefore, as the layout information of the Tiled block 2602*a*, (number of allocation areas in horizontal direction (horizontal number), number of allocation areas in vertical direction (vertical number))=(2, 2) is set.

Positional information is information representing a relative position of an allocation area with respect to the screen area 2601. In FIG. 14, the allocation area corresponding to the communicating unit 2102*a* is the first row, first column allocation area. Therefore, as positional information of the Tiled block 2602*a*, (position in horizontal direction (horizontal position), position in vertical direction (vertical position))=(1, 1) is set. Moreover, in the example shown in FIG. 14, horizontal positions of allocation areas are set such that a horizontal position of an allocation area at a left end is 1 and that horizontal positions of allocation areas are incremented by 1 from left to right. In addition, vertical positions of allocation areas are set such that a vertical position of an allocation area at a top end is 1 and that vertical positions of allocation areas are incremented by 1 from top to bottom.

Resolution information is information representing a resolution of an allocation area. In FIG. 14, the allocation area corresponding to the communicating unit 2102*a* is an area with a size in the horizontal direction (width) of w1 pixels and a size in the vertical direction (height) of h1 pixels. Therefore, (width, height)=(w1, h1) is set as resolution information of the Tiled block 2602*a*.

(Allocation Information Change Process)

An allocation information change process performed by the LCD 2100 will now be described with reference to FIG. 15.

Figure 15:
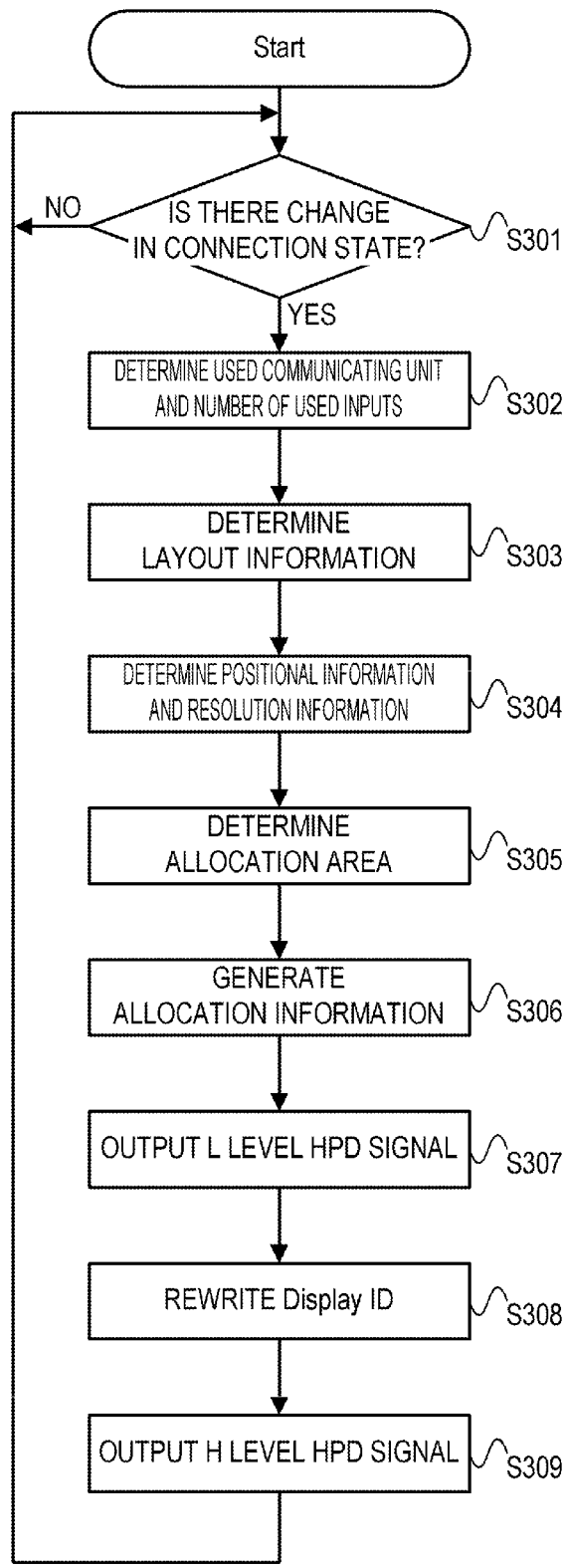
FIG. 15 is a flow chart showing an example of an allocation information change process according to the third embodiment.

FIG. 15 is a flow chart for describing an example of the allocation information change process according to the present embodiment.

An allocation information change process is a process of changing set allocation information to appropriate allocation information in the case where connection states of the communicating units 2102*a*, 2102*b*, 2102*c*, and 2102*d* of the LCD 2100 change. A start of the allocation information change process is triggered by, for example a power supply state of the LCD 2100 being switched from an off state to an on state. Upon start of the allocation information change process, for example, the Tiled block shown in FIG. 14 is set as initial information of allocation information.

It should be understood that the processing flow presented below is simply an example and a processing flow of the allocation information change process according to the present embodiment is not limited to the following processing flow.

First, for each of the four communicating units 2102*a*, 2102*b*, 2102*c*, and 2102*d*, the CPU 2101 determines whether or not a connection state of the communicating unit has changed (S301). Whether or not the connection state of the communicating unit 2102*a* has changed is determined based on a result of detection (result of monitoring) by the connection detecting unit 2402*a*. Whether or not the connection state of the communicating unit 2102*b* has changed is determined based on a result of detection by the connection detecting unit 2402*b*. Whether or not the connection state of the communicating unit 2102*c* has changed is determined based on a result of detection by the connection detecting unit 2402*c*. Whether or not the connection state of the communicating unit 2102*d* has changed is determined based on a result of detection by the connection detecting unit 2402*d*. In the case where there is a communicating unit for which a determination is made that the connection state thereof has changed (S301: YES), the process is advanced to S302. In the case where there is no communicating unit for which a determination is made that the connection state thereof has changed (S301: NO), the process of S301 is repeated until a changed in the connection state is detected.

In S302, a used communicating unit and the number of used inputs are determined. Subsequently, the process is advanced to S303.

First, for each of the four communicating units 2102*a*, 2102*b*, 2102*c*, and 2102*d*, the CPU 2101 determines whether or not the communicating unit is a connected communicating unit. A connected communicating unit refers to a communicating unit to which an external apparatus is connected. Whether or not the communicating unit 2102*a* is a connected communicating unit is determined based on a result of detection by the connection detecting unit 2402*a*. Whether or not the communicating unit 2102*b* is a connected communicating unit is determined based on a result of detection by the connection detecting unit 2402*b*. Whether or not the communicating unit 2102*c* is a connected communicating unit is determined based on a result of detection by the connection detecting unit 2402*c*. Whether or not the communicating unit 2102*d* is a connected communicating unit is determined based on a result of detection by the connection detecting unit 2402*d*.

Next, the CPU 2101 notifies the used communicating unit detecting unit 2105 of the connected communicating units and the number of connections. The number of connections refers to the number of the connected communicating units.

Subsequently, the used communicating unit detecting unit 2105 sets the notified number of connections as the number of used inputs and sets the notified connected communicating units as the used communicating units. Therefore, the connected communicating units can also be referred to as "first communicating units used to transmit and receive data to and from an external apparatus". In the example shown in FIG. 11, 2 is set as the number of connections and the number of used inputs. In addition, in the example shown in FIG. 11, the communicating units 2102a and 2102b are set as connected communicating units and used communicating units.

Moreover, the CPU 2101 may be configured to acquire identification ID information of a connected external apparatus from the connected external apparatus, determine connected communicating units that are connected to the same external apparatus and the number of connections, and notify the used communicating unit detecting unit 2105 of the connected communicating units and the number of connections. In this case, in the case where a first external apparatus is connected to the communicating unit 2102a and a second external apparatus is connected to the communicating unit 2102b, the used communicating unit detecting unit 2105 is notified that the number of connections corresponding to the first external apparatus is 1 and the number of connections corresponding to the second external apparatus is 1.

In S303, the allocation area determining unit 2106 determines layout information in accordance with the number of used inputs determined in S302. Subsequently, the process is advanced to S304.

In the present embodiment, correspondence relationship information shown in FIG. 16 is recorded in advance in the storage unit 2108. Correspondence relationship information is information representing a correspondence relationship between the number of used inputs and allocation information (Tiled blocks). In FIG. 16, layout information (1, 1) is associated with the number of used input 1, layout information (2, 1) is associated with the number of used input 2, layout information (3, 1) is associated with the number of used input 3, and layout information (2, 2) is associated with the number of used input 4.

The allocation area determining unit 2106 acquires layout information corresponding to the number of used inputs determined in S302 from the correspondence relationship information. In the example shown in FIG. 11, layout information (2, 1) is acquired by the allocation area determining unit 2106.

Moreover, correspondence relationship information is not limited to the information described above. For example, layout information (1, 2) may be associated with the number of used inputs 2. Correspondence relationship information may be information that can be changed by the user.

In S304, the allocation area determining unit 2106 determines positional information and resolution information in accordance with the number of used inputs determined in S302. Subsequently, the process is advanced to S305.

In FIG. 16, a combination of positional information (1, 1) and resolution information (w5, h5) is associated with the number of used inputs 1. A combination of positional information (1, 1) and resolution information (w6, h6) and a combination of positional information (2, 1) and resolution information (w7, h7) are associated with the number of used inputs 2. A combination of positional information (1, 1) and resolution information (w8, h8), a combination of positional information (2, 1) and resolution information (w9, h9), and a combination of positional information (3, 1) and resolution information (w10, h10) are associated with the number of used inputs 3. A combination of positional information (1, 1) and resolution information (w1, h1) and a combination of positional information (2, 1) and resolution information (w2, h2) are associated with the number of used inputs 4. A combination of positional information (1, 2) and resolution information (w3, h3) and a combination of positional information (2, 2) and resolution information (w4, h4) are also associated with the number of used inputs 4.

The allocation area determining unit 2106 acquires positional information and resolution information corresponding to the number of used inputs determined in S302 from the correspondence relationship information. In the example shown in FIG. 11, the combination of positional information (1, 1) and resolution information (w6, h6) and the combination of positional information (2, 1) and resolution information (w7, h7) are acquired by the allocation area determining unit 2106.

In S305, the allocation area determining unit 2106 determines an allocation area with respect to the used communicating unit determined in S302. In the case where there are a plurality of used communicating units, an allocation area is determined for each of the plurality of used communicating units. Subsequently, the process is advanced to S306.

In the present embodiment, the allocation area determining unit 2106 assigns positional information determined in S304 to a used communicating unit. Accordingly, an allocation area is determined with respect to the used communicating unit. In the case where there are a plurality of used communicating units, a plurality of positional information determined in S304 are respectively assigned to the plurality of used communicating units. In the example shown in FIG. 11, positional information (1, 1) is assigned to the communicating unit 2102a and positional information (2, 1) is assigned to the communicating unit 2102b.

Moreover, resolution information or a combination of positional information and resolution information may be assigned to a used communicating unit instead of positional information.

In S306, the information changing unit 2107 generates allocation information (Tiled block) with respect to the used communicating unit determined in S302. Specifically, a Display ID including a Tiled block is generated with respect to the used communicating unit determined in S302. In the case where there are a plurality of used communicating units, a Display ID is generated for each of the plurality of used communicating units. Allocation information is generated based on the layout information determined in S303, a correspondence relationship between a used communicating unit and an allocation area determined in S305, and correspondence relationship information. Subsequently, the process is advanced to S307.

In the present embodiment, a Tiled block including the layout information determined in S303, the positional information determined in S305, and resolution information corresponding to the positional information determined in S305 is generated with respect to a used communicating unit. In the case where there are a plurality of used communicating units, a Tiled block of each communicating unit is generated so that the layout information determined in S303 is assigned to each allocation area and the plurality of combinations determined in S304 are respectively assigned to a plurality of allocation areas. In the example shown in FIG. 11, a Tiled block 2700a is generated with respect to the communicating unit 2102a and a Tiled block 2700b is generated with respect to the communicating unit 2102b as shown in FIG. 17. The Tiled block 2700a includes layout information (2, 1), positional information (1, 1), and resolution information (w6, w6). The Tiled block 2700b includes layout information (2, 1), positional information (2, 1), and resolution information (w7, w7).

In S307, the CPU 2101 instructs a used communicating unit to output an L level HPD signal. Accordingly, an L level HPD signal is output from the used communicating unit. Subsequently, the process is advanced to S308.

In the example shown in FIG. 11, instructions to output an L level HPD signal are issued to the communicating units 2102*a* and 2102*b*. Accordingly, an L level HPD signal is output from the control unit 2401*a* of the communicating unit 2102*a* to the HPD line 2303*a* of the DP 2300*a*. In addition, an L level HPD signal is output from the control unit 2401*b* of the communicating unit 2102*b* to the HPD line 2303*b* of the DP 2300*b*.

In S308, the information changing unit 2107 rewrites the Display ID set with respect to the used communicating unit by the Display ID generated in S306. In the case where there are a plurality of used communicating units, for each of the plurality of used communicating units, the Display ID set with respect to the used communicating unit is rewritten by the Display ID generated in S306 with respect to the used communicating unit. Subsequently, the process is advanced to S309.

In the example shown in FIG. 11, the Display ID stored in the volatile memory 2404*a* of the communicating unit 2102*a* is rewritten by the Display ID determined with respect to the communicating unit 2102*a* in S306. In addition, the Display ID stored in the volatile memory 2404*b* of the communicating unit 2102*b* is rewritten by the Display ID determined with respect to the communicating unit 2102*b* in S306.

In S309, the CPU 2101 instructs a used communicating unit to output an H level HPD signal. Accordingly, an H level HPD signal is output from the used communicating unit and enables the PC 2200 to acquire a Display ID from the used communicating unit. Subsequently, the process is returned to S301.

In the example shown in FIG. 11, instructions to output an H level HPD signal are issued to the communicating units 2102*a* and 2102*b*. Accordingly, an H level HPD signal is output from the control unit 2401*a* of the communicating unit 2102*a* to the HPD line 2303*a* of the DP 2300*a* and enables the PC 2200 to acquire a Display ID from the communicating unit 2102*a*. In addition, an H level HPD signal is output from the control unit 2401*b* of the communicating unit 2102*b* to the HPD line 2303*b* of the DP 2300*b* and enables the PC 2200 to acquire a Display ID from the communicating unit 2102*b*.

(Effects)

Effects produced by performing the allocation information change process according to the present embodiment will be described with reference to FIGS. 18A and 18B.

Figure 18A:
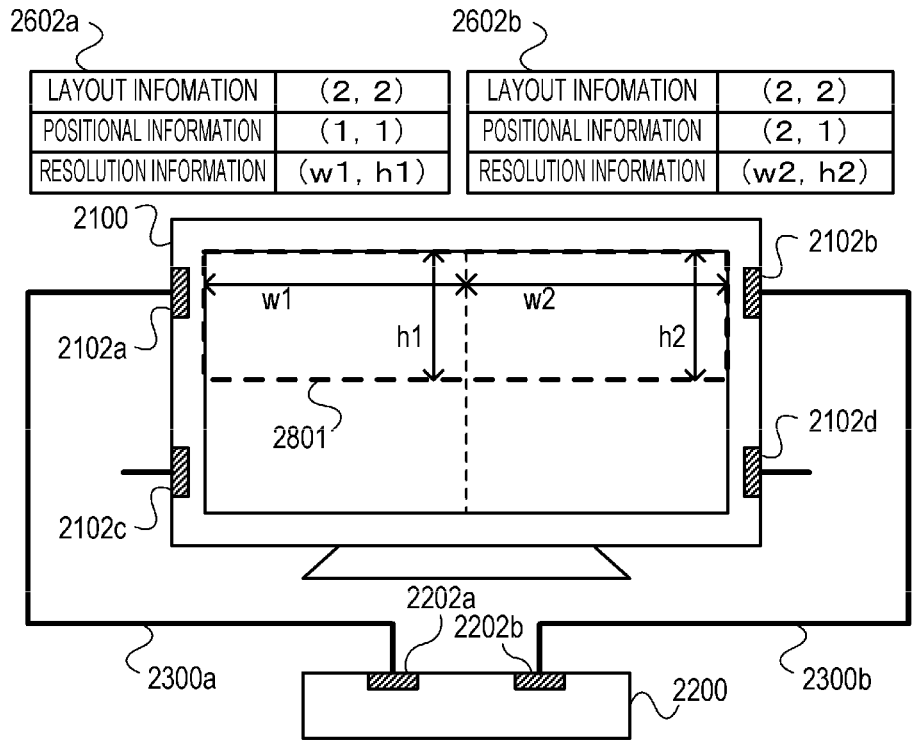
FIG. 18A is a diagram showing an example of a display in the case where an allocation information change process according to the third embodiment is not performed.

FIG. 18A shows an example of a case where an allocation information change process is not performed and information determined in advance is used as allocation information. FIG. 18B shows an example of a case where an allocation information change process is performed.

Figure 18B:
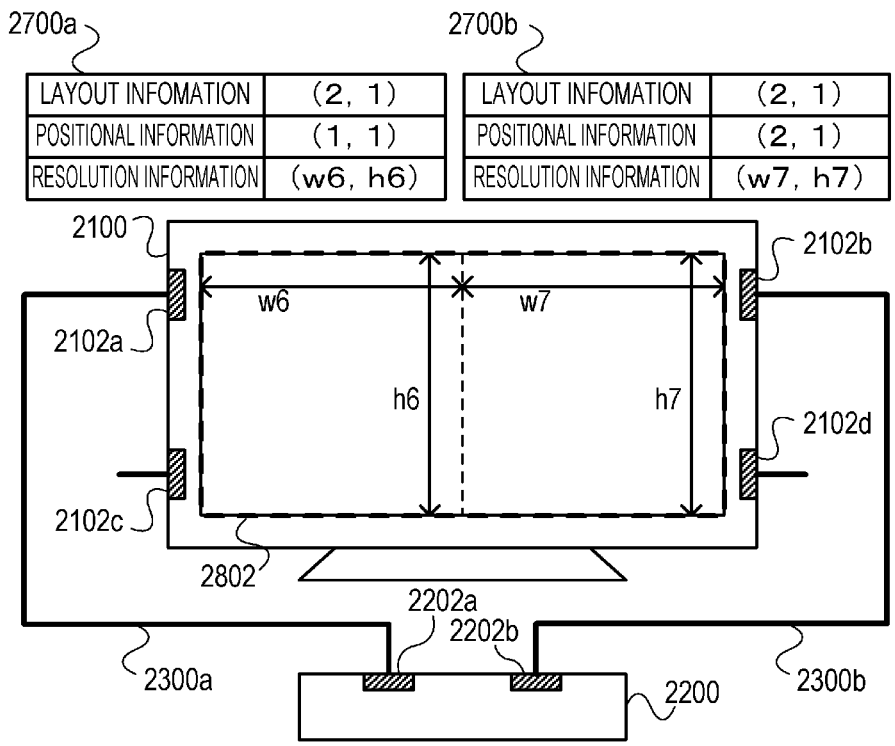
FIG. 18B is a diagram showing an example of a display in the case where an allocation information change process according to the third embodiment is performed.

In FIGS. 18A and 18B, the LCD 2100 is connected to the PC 2200 in a similar manner to FIG. 11. Therefore, used communicating units are the communicating units 2102*a* and 2102*b*.

In the example shown in FIG. 18A, despite used communicating units being a part of the communicating units (the communicating units 2102*a* and 2102*b*), the Tiled blocks 2602*a* and 2602*b* shown in FIG. 14 are set as allocation information corresponding to the communicating units 2102*a* and 2102*b*. Therefore, an image is displayed only in an area depicted by a dashed line 2801 in FIG. 18A. In other words, an image is displayed only in a part of the screen area of the LCD 2100. Specifically, an image is only displayed in an upper half of the screen area. In addition, as described in the second embodiment, in the case where image data input to the communicating units 2102*a* and 2102*b* is image data of an integrated desktop, a partially chipped image ends up being displayed.

In the present embodiment, in the case where there is one used communicating unit, allocation information related to an entire screen area of the LCD 2100 is set with respect to the used communicating unit. In addition, in the case where there are two or more used communicating units, two or more allocation areas constituting the screen area are set with respect to the two or more used communicating units. Therefore, in the example shown in FIG. 18B, the Tiled blocks 2700*a* and 2700*b* shown in FIG. 17 are set as allocation information corresponding to the communicating units 2102*a* and 2102*b*. Accordingly, an image can be displayed in an area depicted by a dashed line 2802 in FIG. 18B. In other words, an image can be displayed in the entire screen area of the LCD 2100 and capabilities of the LCD 2100 can be effectively utilized in a more reliable manner. In addition, an occurrence of chipping of images described earlier can be suppressed.

As described above, according to the present embodiment, in accordance with usage of a plurality of communicating units (first communicating units) included in an image display apparatus, allocation information corresponding to each of the first communicating units is changed as appropriate. Specifically, in the case where there is one used communicating unit, allocation information related to an entire screen area (displayable area) of the image display apparatus is set with respect to the used communicating unit. In addition, in the case where there are two or more used communicating units, two or more allocation areas constituting the screen area (displayable area) are set with respect to the two or more used communicating units. Accordingly, an image output apparatus and an image display apparatus including a plurality of communicating units can now be suitably utilized. Specifically, capabilities of an image display apparatus having a plurality of first communicating units can be utilized more reliably and effectively in the case where an image output apparatus is connected to and used with the image display apparatus. More specifically, an image can be displayed in the entire screen area of the image display apparatus regardless of usage of the plurality of first communicating units.

Moreover, while an example in which allocation information is a Tiled block has been described in the present embodiment, allocation information is not limited thereto. For example, allocation information may be an EDID or the like.

Moreover, while an example in which one image display apparatus includes four first communicating units is described in the present embodiment, the number of first communicating units included in one image display apparatus may be more than or less than four.

Moreover, while an example in which one image output apparatus is connected to one image display apparatus is described in the present embodiment, the number of connected apparatuses is not limited thereto. A plurality of external apparatuses may be connected to one image display apparatus and a plurality of external apparatuses may be connected to one image output apparatus.

Moreover, while examples in which a "screen area (displayable area)" is an entire area capable of displaying an image have been described in the first to third embodiments, a "displayable area" may be a part of an area capable of displaying an image.

Moreover, in S308, format information may be changed in addition to a Tiled block. For example, a resolution of an allocation area may be set as a resolution (maximum value) of image data that can be input to an image display apparatus. Accordingly, a resolution of image data that is input to a first communicating unit can be limited to a resolution that is equal to or lower than the resolution of an allocation area.

Moreover, an image display apparatus may be or may not be configured to always perform an automatic output process. An automatic output process is a process of automatically outputting a Display ID to an external apparatus in the case where the external apparatus is connected to the image display apparatus. The image display apparatus may output a Display ID to an external apparatus in response to an instruction from a user. In addition, the image display apparatus may have a plurality of operating modes including an automatic output mode in which an automatic output process is performed. Furthermore, the image display apparatus may be configured to perform an automatic output process only in the case where the automatic output mode is set.

<Fourth Embodiment>

Hereinafter, an image display system and a control method thereof according to a fourth embodiment of the present invention will be described. Moreover, a description of functions and configurations that are similar to those of the first to third embodiments will be omitted.

Configurations of the image display system, an image output apparatus, and an image display apparatus according to the present embodiment are the same as those of the third embodiment. However, in the present embodiment, the CPU 2101 further includes the two functions described below.

A function that causes a user to input the number of first communicating units (used communicating units) that are used to transmit and receive data to and from an external apparatus as a user-input number A function that notifies a user of a difference between a user-input number and the number of used inputs (number of connections) in the case where there is such a difference (Acquisition of User-input Number)

An example of a method of acquiring a user-input number will be described with reference to FIG. 19A.

Figure 19A:
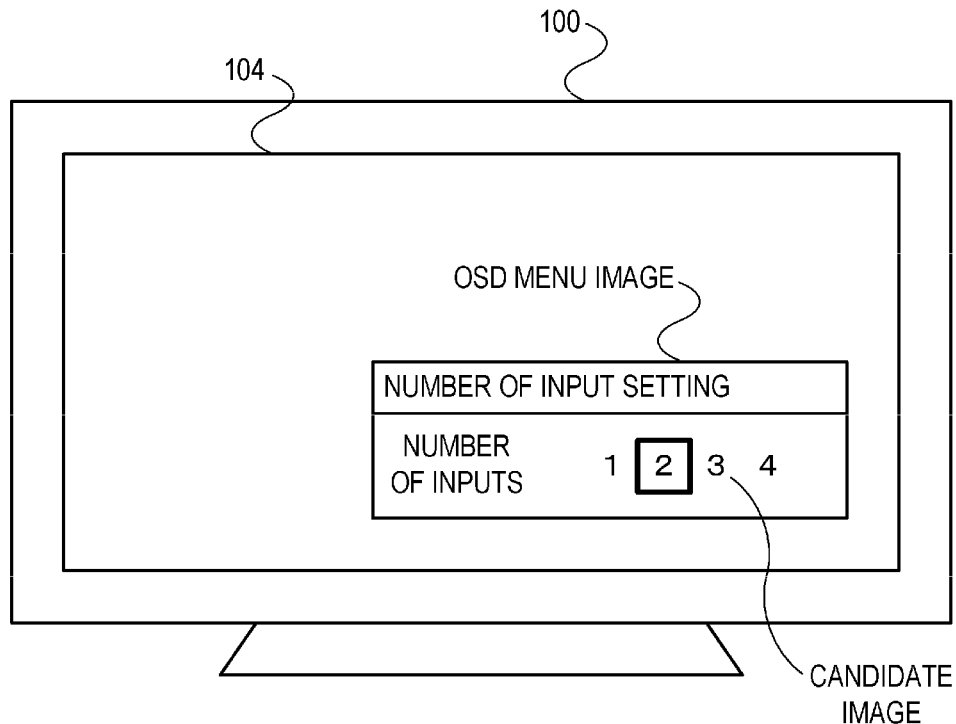
FIG. 19A is a diagram showing an example of an OSD menu image according to a fourth embodiment.

FIG. 19A shows an example of an OSD (On Screen Display) menu image that is displayed on the screen of the LCD 2100.

In the present embodiment, in the case of acquiring a user-input number, the CPU 2101 performs display control for displaying the OSD menu image shown in FIG. 19A on the screen of the LCD 2100.

The user can operate the OSD menu image shown in FIG. 19A using an operating unit (not shown) included in the LCD 2100. For example, a plurality of candidate images (1, 2, 3, and 4) that can be selected by the user are arranged in the OSD menu image shown in FIG. 19A. A candidate image is an image representing a candidate of a user-input number. The user can select any of a plurality of candidate images using an operating unit (not shown).

In addition, the CPU 2101 acquires a user-input number in accordance with a user operation performed with respect to the OSD menu image shown in FIG. 19A and records the acquired user-input number in the storage unit 2108. Specifically, an operation signal in accordance with a user operation for selecting a candidate image is input from the operating unit (not shown) to the CPU 2101. Subsequently, in accordance with the input operation signal, the CPU 2101 records a user-input number corresponding to the candidate image selected by the user in the storage unit 2108.

(Allocation Information Change Process)

An allocation information change process according to the present embodiment will be described with reference to FIG. 20.

Figure 20:
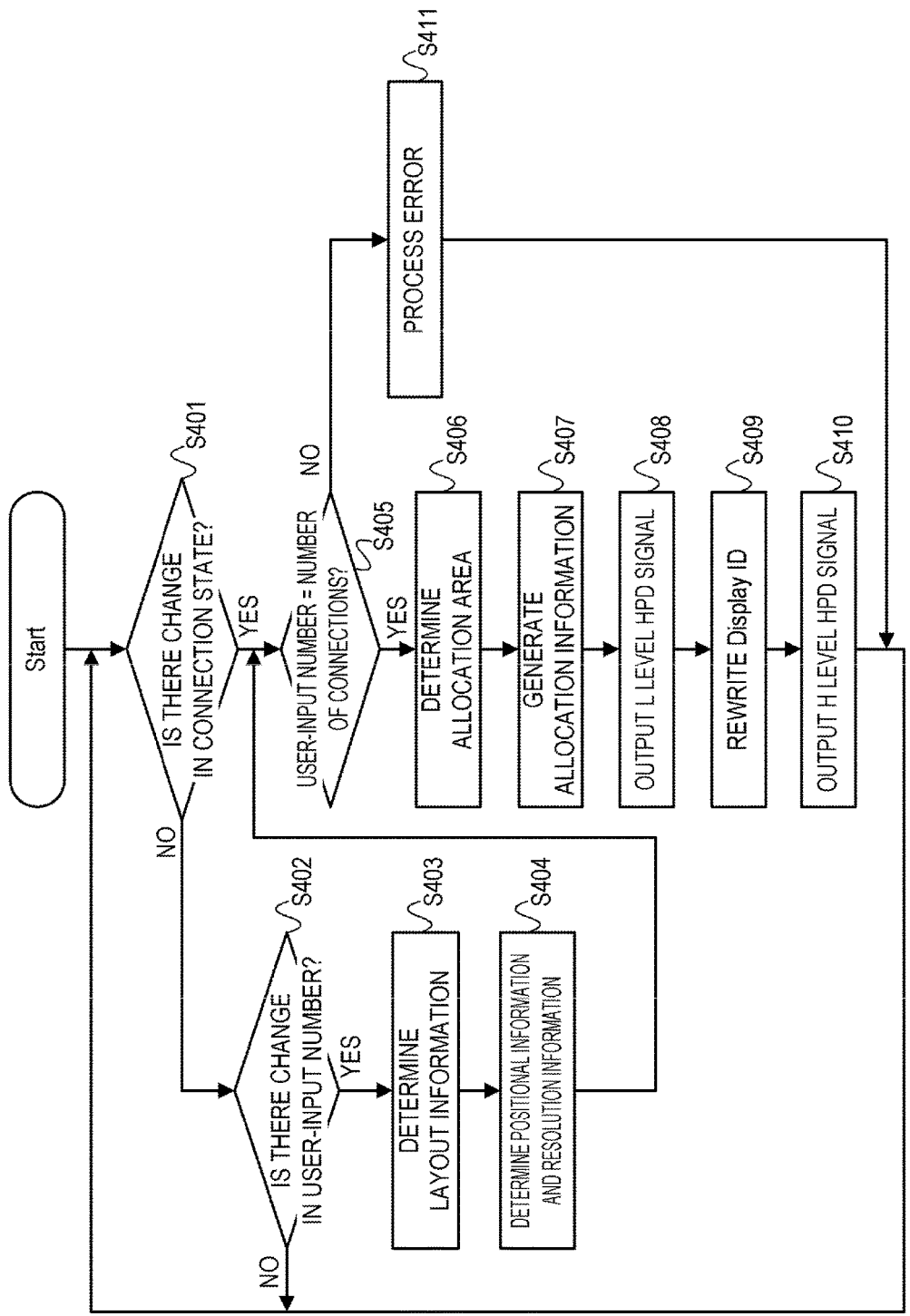
FIG. 20 is a flow chart showing an example of an allocation information change process according to the fourth embodiment.

FIG. 20 is a flow chart for describing an example of the allocation information change process according to the present embodiment.

It should be understood that the processing flow presented below is simply an example and a processing flow of the allocation information change process according to the present embodiment is not limited to the following processing flow.

First, for each of the four communicating units 2102a, 2102b, 2102c, and 2102d, the CPU 2101 determines whether or not a connection state of the communicating unit has changed (S401). In the case where there is a communicating unit for which a determination is made that the connection state thereof has changed (S401: YES), the process is advanced to S405, and in the case where there is no communicating unit for which a determination is made that the connection state thereof has changed (S401: NO), the process is advanced to S402. In the case where there is a communicating unit for which a determination is made that the connection state thereof has changed, the CPU 2101 determines and notifies a connected communicating unit and the number of connections in a similar manner to the third embodiment. In addition, the used communicating unit detecting unit 2105 determines a used communicating unit and the number of used inputs in accordance with the notified connected communicating unit and the number of connections in a similar manner to the third embodiment.

Alternatively, the determination of the number of used inputs may be omitted. The determination of a connected communicating unit, the notification of the connected communicating unit and the number of connections, and the determination of a used communicating unit and the number of used inputs may be performed at any timing as long as the timing occurs between the process of S401 and the process of S406.

In S402, the CPU 2101 determines whether or not a user operation for changing the user-input number has been performed. In the case where it is determined that a user operation for changing the user-input number has been performed (S402: YES), the process is advanced to S403, and in the case where it is determined that a user operation for changing the user-input number has not been performed (S402: NO), the process is returned to S401.

In S403, the allocation area determining unit 2106 determines layout information in accordance with the user-input number determined in S402. Subsequently, the process is advanced to S404. A method of determining layout information is the same as the third embodiment (a user-input number is used instead of the number of used inputs).

In S404, the allocation area determining unit 2106 determines positional information and resolution information in accordance with the user-input number determined in S402. Subsequently, the process is advanced to S405. A method of determining positional information and resolution information is the same as the third embodiment (a user-input number is used instead of the number of used inputs).

In S405, the CPU 2101 determines whether or not the current user-input number is consistent with the current number of connections (number of used inputs). In the case where it is determined that the user-input number is consistent with the number of connections (S405: YES), the process is advanced to S406, and in the case where it is determined that the user-input number is not consistent with the number of connections (S405: NO), the process is advanced to S411.

In the example shown in FIG. 11, the number of connections is 2. Therefore, in the case where the user-input number is 2, a determination is made that the user-input number is consistent with the number of connections and the process is advanced to S406. In the case where the user-input number is not 2, a determination is made that the user-input number is not consistent with the number of connections and the process is advanced to S411.

In S406, the allocation area determining unit 2106 determines an allocation area with respect to a used communicating unit. Subsequently, the process is advanced to S407. A method of determining an allocation area is the same as in the third embodiment.

In S407, the information changing unit 2107 generates allocation information with respect to the used communicating unit. Subsequently, the process is advanced to S408. A method of generating allocation information is the same as in the third embodiment.

In S408, the CPU 2101 instructs the used communicating unit to output an L level HPD signal. Accordingly, an L level HPD signal is output from the used communicating unit. Subsequently, the process is advanced to S409.

In S409, the information changing unit 2107 rewrites a Display ID set with respect to the used communicating unit by the Display ID generated in S407. Subsequently, the process is advanced to S410.

In S410, the CPU 2101 instructs the used communicating unit to output an H level HPD signal. Accordingly, an H level HPD signal is output from the used communicating unit. Subsequently, the process is returned to S401.

In S411, the CPU 2101 performs an error process for notifying the user that the user-input number differs from the number of connections (number of used inputs). Subsequently, the process is returned to S401.

An example of an error process will be described with reference to FIG. 21.

Figure 21:
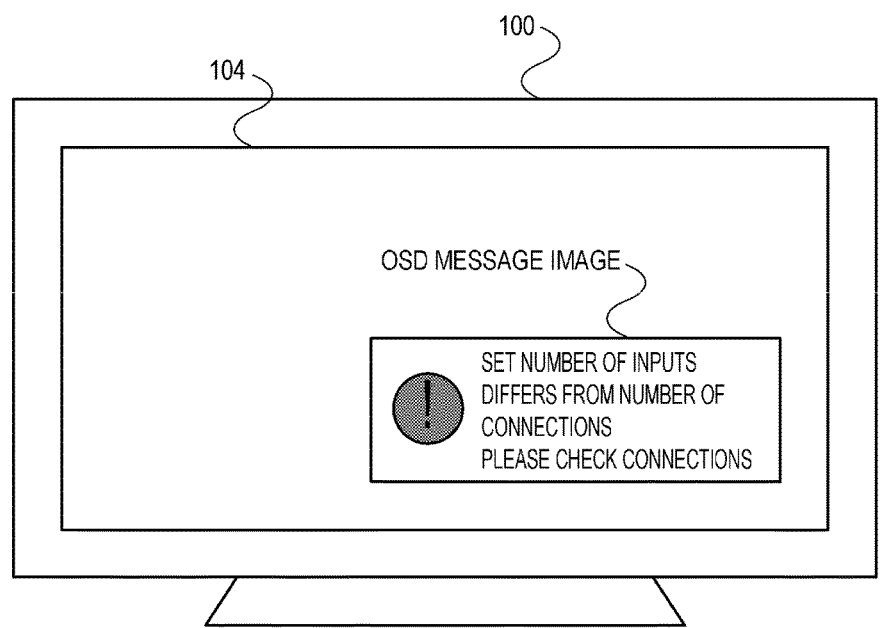
FIG. 21 is a diagram showing an example of an OSD message image according to the fourth embodiment.

FIG. 21 shows an example of an OSD message image that is displayed on the screen of the LCD 2100 by an error process. As the error process, for example, the CPU 2101 performs display control for displaying the OSD message image shown in FIG. 21 on the screen of the LCD 2100. The OSD message image shown in FIG. 21 includes a message describing that the user-input number differs from the number of connections. Therefore, by checking the OSD message image shown in FIG. 21, the user can realize that the user-input number differs from the number of connections. As a result, the user can be prompted to review the user-input number, review a connection state between the LCD 2100 and an external apparatus, and the like. In addition, a state of the image display system can be guided to a state where the user-input number and the number of connections are consistent with each other. The user-input number is the number of used communicating units that are assumed by the user. Therefore, by guiding the state of the image display system to a state where the user-input number and the number of connections are consistent with each other, the image display system becomes capable of performing a process intended by the user. Specifically, the image display system becomes capable of performing a process for setting the number of allocation areas intended by the user.

As described above, according to the present embodiment, in accordance with usage of a plurality of communicating units (first communicating units) included in an image display apparatus, allocation information corresponding to each of the first communicating units are changed as appropriate. Accordingly, capabilities of an image display apparatus having a plurality of first communicating units can be utilized more reliably and effectively in the case where an image output apparatus is connected to and used with the image display apparatus.

In addition, according to the present embodiment, in the case where the user-input number differs from the number of used inputs, the user is notified of the fact that the user-input number differs from the number of used inputs. Accordingly, the image display system can be made to perform a process intended by the user.

Moreover, while an example in which a user-input number is acquired using an OSD menu image has been described in the present embodiment, a method of acquiring a user-input number is not limited thereto. For example, a user-input number may be acquired using an application executed by an external apparatus (such as a PC). Alternatively, a user-input number may be acquired in accordance with a user operation performed with respect to buttons provided on the LCD 2100.

Moreover, while an example in which a message expressing that the user-input number differs from the number of connections is displayed has been described in the present embodiment, a method of notifying that the user-input number differs from the number of connections is not limited thereto. For example, an icon expressing that the user-input number differs from the number of connections may be displayed. Alternatively, the user may be notified that the user-input number differs from the number of connections by sound. Alternatively, the user may be notified that the user-input number differs from the number of connections by controlling an emission state of a light emitting unit that differs from a display unit.

Figure 19B:
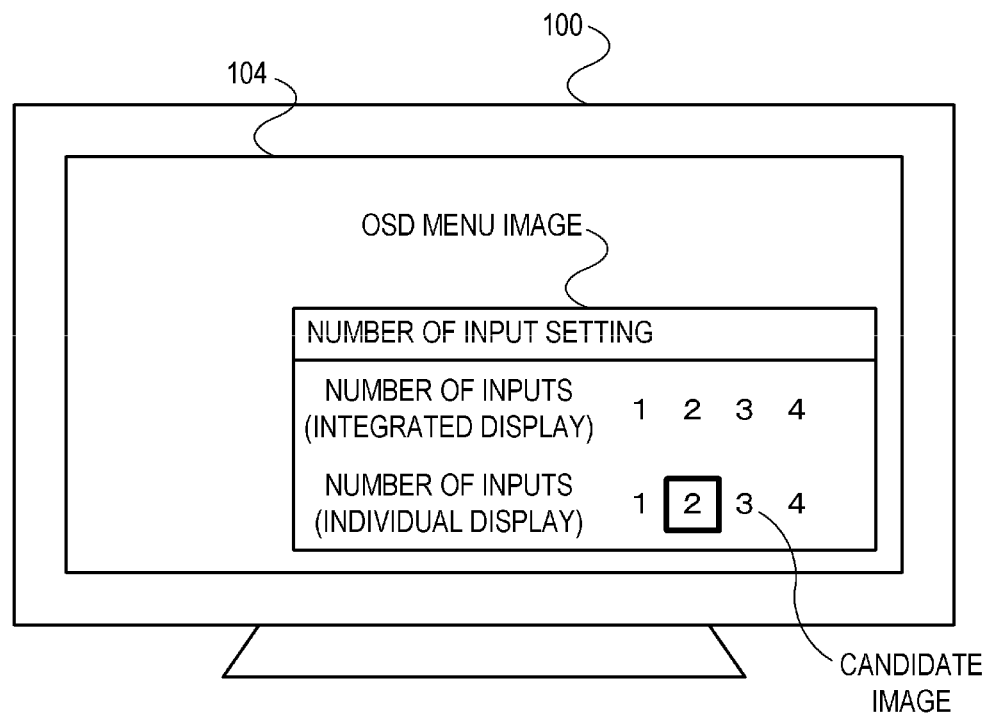
FIG. 19B is a diagram showing an example of an OSD menu image according to the fourth embodiment.

In addition, the present embodiment, in the case where the number of inputs is two or more, it is premised that a plurality of divided images are to be input and integratedly displayed as one image, whereby a user inputs the number of inputs used for the integrated display. In order to also accommodate cases where a plurality of input images are desirably individually displayed, as shown in FIG. 19B, the number of inputs to be used for integrated display and the number of inputs to be used for individual display may be arranged to be input separately. For example, in the case where the number of inputs to be used for individually display is 2, since a total number of used inputs is 2, the respective inputs are used for individual display. Therefore, a Display ID including allocation information such as layout information, positional information, and resolution information in the case of the number of used inputs 1 shown in FIG. 16 is generated and a Display ID is rewritten by the generated Display ID.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-182451, filed on Sep. 8, 2014, and Japanese Patent Application No. 2015-109662, filed on May 29, 2015, which are hereby incorporated by reference herein in their entirety.

REFERENCE SIGNS 100, 800 and 2200: image output apparatus, 102, 103, 104, 802, 803, 2202a and 2202b: communicating unit, 105, 108, 111, 2203a and 2203b: image output unit, 106, 109, 112, 2204a and 2204b: information acquiring unit, 115, 805 and 2207: desktop setting unit, 200, 900 and 2100: image display apparatus, 202, 203, 902, 903, 904 and 905: communicating unit, 2102a, 2102b, 2102c and 2102d: communicating unit, 2105: used communicating unit detecting unit, 2106: allocation area determining unit, 2107: information changing unit

The invention claimed is:

1. An image output apparatus connectable to an image display apparatus including a plurality of first communicating units that can be used to transmit and receive data to and from an external apparatus,
    an area of a screen of the image display apparatus being made up of a plurality of partial display areas capable of individually displaying an image,
    the plurality of partial display areas being associated with the plurality of first communicating units,
    the image output apparatus comprising:
    a plurality of second communicating units that ,can be used to transmit and receive data to and from an external apparatus;
    an acquiring unit configured to acquire, for each of the second communicating unit connected to the first communicating unit, from the first communicating unit connected to the second communicating unit, correspondence information that is information related to a partial display area associated with the first communicating unit;
    a setting unit configured to set, for each of the second communicating unit, any of a plurality of output modes including a first output mode for outputting image data of an original image in any one of a plurality of partial image areas constituting an area of the original image; and
    an outputting unit configured to output, for each of the second communicating unit, image data based on an output node set with respect to the second communicating unit using the second communicating unit, wherein
    the correspondence information is a Tiled Display Topology Data Block as defined by a VESA (Video Electronics Standard Association) standard, and
    the setting unit automatically sets the first output mode with respect to a second communicating unit for which the correspondence information has been acquired.

2. The image output apparatus according to claim 1, wherein
    the correspondence information related to the partial display area includes area information relating to the partial display area, and the setting unit automatically sets a first output mode in which an area of the original image corresponding to a partial display area represented by the area information included in the correspondence information in the case here an entire area of the se corresponds to an entire area of the original image is set as the partial image area, with respect to the second communicating unit for which the correspondence information has been acquired.

3. The image output apparatus according to claim 1, wherein the setting unit:
    performs in the case where correspondence information with respect to partial display areas has been acquired, a setting process that automatically sets the first output mode with respect to the second communicating unit for which the correspondence information has been acquired by the acquiring unit; and
    omits the setting process in other cases.

4. The image output apparatus according to claim 3, wherein
    in the ease of omitting the setting process, the setting unit automatically sets a second output mode in which image data corresponding to one screen is output, with respect to the second communicating unit for which the correspondence information has been acquired.

5. The image output apparatus according to claim 4, wherein
    the correspondence information related to the partial display area includes positional information relating to a relative position of the partial display area with respect to the area of the screen,
    the second output mode is an output ode which image data of one virtual screen is output, and
    in the case of setting the second output mode with respect to each of two or more second communicating units for which the correspondence information has been acquired, the setting unit sets two or more second output modes with respect to the two or more second communicating units so that an arrangement of two or more virtual screens assumed in the two or more second output modes is consistent with an arrangement of two or more partial display areas related to two or more correspondence information that have been acquired with respect to the two or more second communicating units.

6. The image output apparatus according to claim 1, wherein the setting unit:

omits the setting process in the as where a total number of the acquired correspondence information is not consistent with a total number of the partial display areas.

7. The image output apparatus according to claim 1, wherein in the case where a user operation for releasing the first output mode that has been set to the second communicating unit is performed, the setting unit automatically sets a second output mode in which image data corresponding to one screen is output, with respect to the second communicating unit.

8. The image output apparatus according to claim 1, further comprising a detecting unit configured to detect a connection of the e al apparatus to each of the second communicating unit, wherein for each of the second communicating unit, a process of acquiring the correspondence information and a process of setting the output mode are performed with respect to the second communicating unit in response to the connection of the external apparatus to the second communicating unit being detected by the detecting unit.

9. The image output apparatus according to claim 1, wherein the setting unit automatically sets a second output mode in which image data corresponding to one screen is output, with respect to the second communicating unit for which the correspondence information has not been acquired.

10. An image display apparatus comprising:

a plurality of first communicating units that can be used to transmit and receive data to and from an external apparatus;

a detecting unit configured to detect a first communicating unit used to transmit and receive data to and from the external apparatus;

a determining unit configured to determine a part of or all of an area of a screen as an allocation area with respect to the first communicating unit detected by the detecting unit;

a generating unit configured to generate, with respect to the first communicating unit detected by the detecting unit, allocation information which is information related to the allocation area determined with respect to the first communicating unit; and a storing unit configured to re the allocation information generated by the generating unit, wherein the allocation information is a Tiled Display Topology Data Block as defined by a VESA (Video Electronics Standard Association) standard, and in the case where two or more first communicating units are detected by the detecting unit, the determining unit determines two or more allocation areas constituting the area of the screen with respect to the two or more first communicating units.

11. The image display apparatus according to claim 10, wherein the allocation information includes number information relating to a total number of the allocation areas.

12. The image display apparatus according to claim 10, wherein the allocation information related to the allocation area includes area information relating to the allocation area.

13. The image display apparatus according to claim 10, wherein the allocation information related to the allocation area includes positional information relating to a relative position of the allocation area with respect to the area of the screen.

14. The image display apparatus according to claim 10, wherein the allocation information related to the allocation area includes resolution information relating to a resolution of the allocation area.

15. The image display apparatus according to claim 10, the image display apparatus being connectable to an image output apparatus including a plurality of second communicating units that can be used to transmit and receive data to and from an external apparatus, wherein the detecting unit detects a first communicating unit used to transmit and receive data to and from the age output apparatus.

16. The image display apparatus according to claim 1, wherein the first communicating unit used to transmit and receive data to and from the image output apparatus acquires identification information of the image output apparatus, and the detecting unit detects a first communicating unit having acquired the identification information of the image output apparatus.

17. The image display apparatus according to claim 10, wherein the detecting unit detects a first communicating unit connected to an external apparatus.

18. The image display apparatus according to claim 10, further comprising:

an inputting unit configured to cause a user to input the number of the first communicating unit used to transmit and receive data to and from an external apparatus as the number of inputs; and a notifying unit configured to, in the case where the number of inputs input by the user differs from the number of the first communicating unit detected by the detecting unit, notify the user of the fact that the number of inputs differs from the number of the first communicating unit detected by the detecting unit.

19. A control method of an image output apparatus connectable to an image display apparatus including a plurality of first communicating units that can be used to transmit and receive data to and from an external apparatus, an area of a screen of the image display apparatus being made up of a plurality of partial display areas capable of individually displaying an image, the plurality of partial display areas being associated with the plurality of first communicating units, the image output apparatus including a plurality of second communicating units that cat be used to transmit and receive data to and from an external apparatus, the control method of an image output apparatus comprising:

an acquiring step of acquiring, for each of the second communicating unit connected to the first communicating unit, from the first communicating unit connected to the second communicating unit, correspondence information that is information related to a partial display area associated with the first communicating unit;

a setting step of setting, for each of the second communicating unit, any of a plurality of output modes including a first output mode for outputting, partial image data of an original image in any one of a plurality of partial image areas constituting an area of the original image; and an outputting step of outputting, for each of the second communicating unit, image data based on an output mode set with respect to the second communicating unit using the second communicating unit, wherein the correspondence information is a Tiled Display Topology Data Block as defined by a VESA (Video Electronics Standard Association) standard, and in the setting step, the first output mode is automatically set with respect to a second communicating unit for which the correspondence information has been acquired.

20. A control method of an image display apparatus including a plurality of first communicating units that can be used to transmit and receive data to and from an external apparatus, the control method of an image display apparatus comprising:

a detecting step of detecting a first communicating unit used to transmit and receive data to and from the external apparatus;

a determining step of determining a part of or all of an area of a screen as an allocation area with respect to the first communicating unit detected in the detecting, step;

a generating step of generating, with respect to the first communicating unit detected in the detecting step, allocation information which is information related to the allocation area determined with respect to the first communicating unit; and a storing step of storing the allocation information generated in the generating step, wherein the allocation information is a Tiled Display Topology Data Block as defined by a VESA (Video Electronics Standard Association) standard, and in the determining step, in the case where two or more first communicating units are detected in the detecting step, two or more allocation areas constituting the area of the screen are determined with respect to the two or more first communicating units.

* * * * *